United States Patent
Kawai et al.

(10) Patent No.: US 10,386,831 B2
(45) Date of Patent: Aug. 20, 2019

(54) MACHINING STATUS DISPLAY APPARATUS

(71) Applicant: DMG MORI CO., LTD., Nara (JP)

(72) Inventors: Kengo Kawai, Nara (JP); Katsuhiko Ono, Nara (JP); Shizuo Nishikawa, Nara (JP); Masataka Sakamoto, Nara (JP); Morihiro Hideta, Nara (JP); Koji Iiyama, Nara (JP)

(73) Assignee: DMG MORI CO., LTD., Nara (JP)

( * ) Notice: Subject to any disclaimer, the term of this patent is extended or adjusted under 35 U.S.C. 154(b) by 190 days.

(21) Appl. No.: 15/630,558

(22) Filed: Jun. 22, 2017

(65) Prior Publication Data

US 2018/0004196 A1 Jan. 4, 2018

(30) Foreign Application Priority Data

Jul. 4, 2016 (JP) ................................ 2016-132491
Dec. 14, 2016 (JP) ................................ 2016-242085

(51) Int. Cl.

| G05B 9/02 | (2006.01) |
| G05B 23/02 | (2006.01) |
| B23Q 1/00 | (2006.01) |
| B23Q 17/09 | (2006.01) |

(Continued)

(52) U.S. Cl.
CPC ....... G05B 23/0272 (2013.01); B23Q 1/0045 (2013.01); B23Q 17/007 (2013.01); B23Q 17/0952 (2013.01); B23Q 17/0976 (2013.01); B23Q 17/0995 (2013.01); G05B 19/409 (2013.01)

(58) Field of Classification Search
USPC .......................................................... 700/79
See application file for complete search history.

(56) References Cited

U.S. PATENT DOCUMENTS

2010/0104388 A1* 4/2010 Suzuki ............... B23Q 11/0039
                                                              409/131
2014/0288692 A1* 9/2014 Kawashima ..... G05B 19/40937
                                                              700/160

(Continued)

FOREIGN PATENT DOCUMENTS

JP        2012200848 A    10/2012

*Primary Examiner* — Md Azad
(74) *Attorney, Agent, or Firm* — Miller, Matthias & Hull LLP

(57) ABSTRACT

A machining status display apparatus includes a display device having a display screen, a stability lobe picture creator creating, based on specifications of a tool to be used, display picture data for displaying a stability lobe as a correlation diagram between a spindle rotation speed and a limit depth of cut of the tool above which regenerative chatter occurs, a first machining information picture creator creating display picture data for displaying machining related information other than regenerative chatter corresponding to set machining conditions, and a display controller displaying the stability lobe and the machining related information with the stability lobe and the machining related information superimposed one on another on the display screen of the display device based on the display picture data created by the stability lobe picture creator and the display picture data created by the first machining information picture creator.

12 Claims, 19 Drawing Sheets

(51) Int. Cl.
*G05B 19/409* (2006.01)
*B23Q 17/00* (2006.01)

(56) References Cited

U.S. PATENT DOCUMENTS

| | | | | |
|---|---|---|---|---|
| 2016/0116899 A1* | 4/2016 | Piner | ................ | G05B 19/404 700/173 |
| 2017/0038761 A1* | 2/2017 | Ando | ................ | G05B 19/406 |
| 2017/0315535 A1* | 11/2017 | Ishii | ................ | G05B 19/402 |

* cited by examiner

FIG. 2

| Tool No. | Type | Material i | The number of edges | Tool diameter D [mm] | Natural frequency ω [rad/sec] | | Damping ratio ζ [%] | | Equivalent mass m [kg] | |
|---|---|---|---|---|---|---|---|---|---|---|
| | | | | | $\omega_x$ | $\omega_y$ | $\zeta_x$ | $\zeta_y$ | $m_x$ | $m_y$ |
| 0001 | End mill | i=1 | 4 | 20 | $\omega_{x1}$ | $\omega_{y1}$ | $\zeta_{x1}$ | $\zeta_{y1}$ | $m_{x1}$ | $m_{y1}$ |
| 0002 | Milling cutter | i=2 | 8 | 160 | $\omega_{x2}$ | $\omega_{y2}$ | $\zeta_{x2}$ | $\zeta_{y2}$ | $m_{x2}$ | $m_{y2}$ |
| 0003 | End mill | i=1 | 2 | 20 | $\omega_{x3}$ | $\omega_{y3}$ | $\zeta_{x3}$ | $\zeta_{y3}$ | $m_{x3}$ | $m_{y3}$ |
| 0004 | End mill | i=1 | 4 | 16 | $\omega_{x4}$ | $\omega_{y4}$ | $\zeta_{x4}$ | $\zeta_{y4}$ | $m_{x4}$ | $m_{y4}$ |
| 0005 | Milling cutter | i=3 | 4 | 80 | $\omega_{x5}$ | $\omega_{y5}$ | $\zeta_{x5}$ | $\zeta_{y5}$ | $m_{x5}$ | $m_{y5}$ |

FIG. 3

|  |  | Cutting rigidity $K_{tj}$ [N/m$^2$] | Specific cutting rigidity $K_{rj}$ [%] |
|---|---|---|---|
| Workpiece material □ | j=1 | $K_{t1}$ | $K_{r1}$ |
|  | j=2 | $K_{t2}$ | $K_{r2}$ |
|  | j=3 | $K_{t3}$ | $K_{r3}$ |
|  | j=4 | $K_{t4}$ | $K_{r4}$ |

FIG. 4

Tool life coefficient $n_{i,j,h}$

| Tool material [i=1] | | Wear limit [h] | | |
|---|---|---|---|---|
|  |  | h=1 | h=2 | h=3 |
| Workpiece material □ | j=1 | $n_{1,1,1}$ | $n_{1,1,2}$ | $n_{1,1,3}$ |
|  | j=2 | $n_{1,2,1}$ | $n_{1,2,2}$ | $n_{1,2,3}$ |
|  | j=3 | $n_{1,3,1}$ | $n_{1,3,2}$ | $n_{1,3,3}$ |
|  | j=4 | $n_{1,4,1}$ | $n_{1,4,2}$ | $n_{1,4,3}$ |

Tool material [i=2]
Tool material [i=3]
Tool material [i=4]

FIG.5

Tool life coefficient $C_{i,j,h}$

| Tool material [i=1] | | Wear limit [h] | | |
|---|---|---|---|---|
| | | h=1 | h=2 | h=3 |
| Workpiece material [j] | j=1 | $C_{1,1,1}$ | $C_{1,1,2}$ | $C_{1,1,3}$ |
| | j=2 | $C_{1,2,1}$ | $C_{1,2,2}$ | $C_{1,2,3}$ |
| | j=3 | $C_{1,3,1}$ | $C_{1,3,2}$ | $C_{1,3,3}$ |
| | j=4 | $C_{1,4,1}$ | $C_{1,4,2}$ | $C_{1,4,3}$ |

Tool material [i=2]
Tool material [i=3]
Tool material [i=4]

MACHINING STATUS DISPLAY APPARATUS

BACKGROUND

Field of the Disclosure

The present disclosure relates to an apparatus for displaying a status of machining performed in a machine tool, more particularly, relates to an apparatus for displaying a machining status assumed for machining under predetermined machining conditions.

Background of the Disclosure

In the field of machining using a machine tool, machining a workpiece efficiently and reducing machining costs have been pursued, which are permanent issues. At the same time, machining accuracy required in machining becomes higher day by day. Therefore, in machining a workpiece, machining conditions which satisfy required standards have to be set with respect to machining efficiency, machining costs, and machining accuracy.

Accordingly, there has been known a display apparatus that focuses on regenerative chatter among elements related to machining accuracy and is configured to display, on a screen, a stability lobe showing a correlation between a spindle rotation speed for rotating a tool or a workpiece and a limit depth of cut of the tool above which regenerative chatter occurs (see Japanese Unexamined Patent Application Publication No. 2012-200848).

With this display apparatus, because the stability lobe showing the correlation between the spindle rotation speed and the limit depth of cut of the tool above which regenerative chatter occurs is displayed on a screen, the operator can instantaneously, visually recognize a relationship between the spindle rotation speed and the depth of cut of the tool which does not produce regenerative chatter; therefore, the operator can appropriately set machining conditions which produce no regenerative chatter and provide a high machining efficiency.

For example, the operator can set the highest spindle rotation speed and largest depth of cut available for cutting within a region where no regenerative chatter occurs, taking into account cutting resistance and the like based on his experiential knowledge.

Thus, according to this conventional display apparatus, the operator can set highly efficient machining conditions within a range where no regenerative chatter occurs, based on the stability lobe displayed on the display apparatus.

SUMMARY OF THE DISCLOSURE

By the way, in order to set appropriate machining conditions, as described above, it is necessary to comprehensively consider elements related to machining efficiency, machining costs, and machining accuracy.

However, in the above-described conventional display apparatus, only the stability lobe showing the correlation between the spindle rotation speed and the limit depth of cut of above which regenerative chatter occurs is displayed; therefore, evaluation of elements other than regenerative chatter which are related to machining efficiency, machining costs, and machining accuracy has no choice but to depend on the operator's experiential knowledge. Therefore, in terms of the above-mentioned comprehensive consideration, there is a problem that the stability lobe alone is not necessarily sufficient to set appropriate machining conditions. On the other hand, appropriate machining conditions have to be set even under such a circumstance; however, to this end, time is needed to sufficiently consider the other elements related to machining efficiency, machining costs, and machining accuracy, and therefore it is not possible to quickly set machining conditions.

Accordingly, if it is possible to display not only the stability lobe but also information relating to other elements related to machining efficiency, machining costs, and machining accuracy (machining related information) on a screen, the operator can quickly recognize appropriate machining conditions from the displayed information, which is very convenient.

The present disclosure has been achieved in view of the above-described circumstances, and an object thereof is to provide a machining status display apparatus, etc. capable of displaying not only the stability lobe but also other machining related information.

The present disclosure, for solving the above-described problems, relates to a machining status display apparatus, including:

a display device having a display screen;

a stability lobe picture creator obtaining, based on specifications of a tool to be used, first correlation data relating to a correlation between a spindle rotation speed and a limit depth of cut of the tool above which regenerative chatter occurs, and creating display picture data for displaying a stability lobe as a correlation diagram between the spindle rotation speed and the limit depth of cut based on the obtained first correction data;

a first machining information picture creator obtaining machining related information other than the regenerative chatter corresponding to set machining conditions, and creating display picture data for displaying the obtained machining related information; and a display controller displaying the stability lobe and the machining related information with the stability lobe and the machining related information superimposed one on another on the display screen of the display device based on the display picture data created by the stability lobe picture creator and the display picture data created by the first machining information picture creator.

In this machining status display apparatus, first, in the stability lobe picture creator, first correlation data relating to a correlation between a spindle rotation speed and a limit depth of cut of a tool to be used above which regenerative chatter occurs is obtained based on specifications of the tool, and a display picture data for displaying a stability lobe that is a correlation diagram between the spindle rotation speed and the limit depth of cut is created based on the obtained first correlation data. Further, in the first machining information picture creator, display picture data for displaying machining related information other than the regenerative chatter is created in accordance with set machining conditions.

Subsequently, based on the display picture data created by the stability lobe picture creator and the display picture data created by the first machining information picture creator, the display controller displays the stability lobe and the machining related information with the stability lobe and the machining related information superimposed one on another on the display screen of the display device.

Note that the machining related information is information other than the regenerative chatter, which is related to the above-mentioned machining efficiency, machining costs, and machining accuracy.

Thus, with this machining status display apparatus, the stability lobe and the machining related information are displayed in a mutually superimposed manner; therefore, by looking at the diagram and information, the operator can quickly recognize preferable machining conditions which are based on comprehensive consideration of the stability lobe and the other machining related information.

Note that this machining status display apparatus may have a configuration in which the first machining information picture creator is configured to obtain, as the machining related information, one or more pieces of information selected from among information relating to a cutting efficiency, information relating to a tool life of the tool to be used, information relating to a total cutting amount the tool to be used is able to cut before reaching the end of its tool life, and information relating to a load acting on a spindle motor, and create one or more pieces of display picture data corresponding to the selected one or more pieces of information for displaying the obtained selected one or more pieces of information, and the display controller is configured to display the stability lobe and the selected one or more pieces of information with the stability lobe and the selected one or more pieces of information superimposed one on another on the display screen of the display device.

With this configuration, one or more pieces of information selected from among information relating to a cutting efficiency, information relating to a tool life of the tool to be used, information relating to a total cutting amount the tool to be used is able to cut before reaching the end of its tool life, and information relating to a load acting on a spindle motor, as well as the stability lobe are displayed in a mutually superimposed manner on the display screen of the display device; therefore, by looking at them, the operator can quickly recognize preferable machining conditions which are based on comprehensive consideration of the stability lobe and the selected machining information.

Further, the machining status display apparatus according to the present disclosure may further include a second machining information picture creator obtaining, based on the first correlation data obtained by the stability lobe picture creator and the machining related information obtained by the first machining information picture creator or based on the display picture data for the stability lobe created by the stability lobe picture creator and the display picture data for the machining related information created by the first machining information picture creator, second correlation data relating to a correlation between the spindle rotation speed and the machining related information in machining with the limit depth of cut, and creating display picture data for displaying a diagram relating to the correlation between the spindle rotation speed and the machining related information based on the obtained second correlation data, wherein the display controller is further configured to display a correlation diagram between the spindle rotation speed and the machining related information on the display screen of the display device based on the display picture data created by the second machining information picture creator.

With this configuration, display picture data for displaying a correlation diagram between the spindle rotation speed and the machining related information in machining with the limit depth of cut is created by the second machining information picture creator, and the correlation diagram between the spindle rotation speed and the machining related information in machining with the limit depth of cut is displayed on the display screen of the display device by the display controller. This correlation diagram is, for example, a correlation diagram between the spindle rotation speed and the cutting efficiency, a correlation diagram between the spindle rotation speed and the total cutting amount the tool to be used is able to cut before reaching the end of its tool life, a correlation diagram between the spindle rotation speed and the load acting on the spindle motor, or the like. By looking at such a correlation diagram, the operator can instantaneously, visually recognize, in other words, intuitively recognize which spindle rotation speed provides the most preferable machining status within a range where no regenerative chatter occurs.

For example, by looking at the correlation diagram between the spindle rotation speed and the cutting efficiency, the operator can intuitively recognize which spindle rotation speed achieves machining with the highest cutting efficiency within the range where no regenerative chatter occurs. Further, by looking at the correlation diagram between the spindle rotation speed and the total cutting amount, the operator can intuitively recognize which spindle rotation speed achieves machining with machining efficiency and tool costs well balanced with each other within the range where no regenerative chatter occurs.

The above-described machining status display apparatus according to the present disclosure can be implemented by a computer having a display. In such a case, the stability lobe picture creator, the machining information picture creators, and the display controller are implemented by a computer program that operates on the computer. Further, such a computer program can be stored in a computer-readable storage medium as appropriate, and causing an appropriate computer to read the computer program from the storage medium to run the computer programs on the computer causes the computer to function as the machining status display apparatus.

Alternatively, such a computer program may be downloaded in an appropriate computer from an appropriate server that provides the computer program, through an appropriate network, such as the internet. In such a case, running the computer program on the computer in which the computer program has been downloaded causes the computer to function as the machining status display apparatus.

As described above, in the machining status display apparatus according to the present disclosure, a stability lobe and other machining related information are displayed in a mutually superimposed manner. Therefore, by looking at the diagram and information, the operator can quickly recognize preferable machining conditions which are based on comprehensive consideration of the stability lobe and the other machining related information.

Further, a correlation diagram between the spindle rotation speed and the machining related information in machining with a limit depth of cut is displayed; therefore, by looking at this correlation diagram, the operator can intuitively recognize which spindle rotation speed provides the most preferable machining status within a range where no regenerative chatter occurs.

BRIEF DESCRIPTION OF THE DRAWINGS

FIG. 2 is an illustration for explaining tool information stored in a tool information storage in the embodiment;

FIG. 3 is an illustration for explaining workpiece information stored in a workpiece information storage in the embodiment;

FIG. 4 is an illustration for explaining a tool life coefficient stored in a tool life coefficient storage in the embodiment;

FIG. 5 is an illustration for explaining a tool life coefficient stored in the tool life coefficient storage in the embodiment;

DETAILED DESCRIPTION

Figure 1:
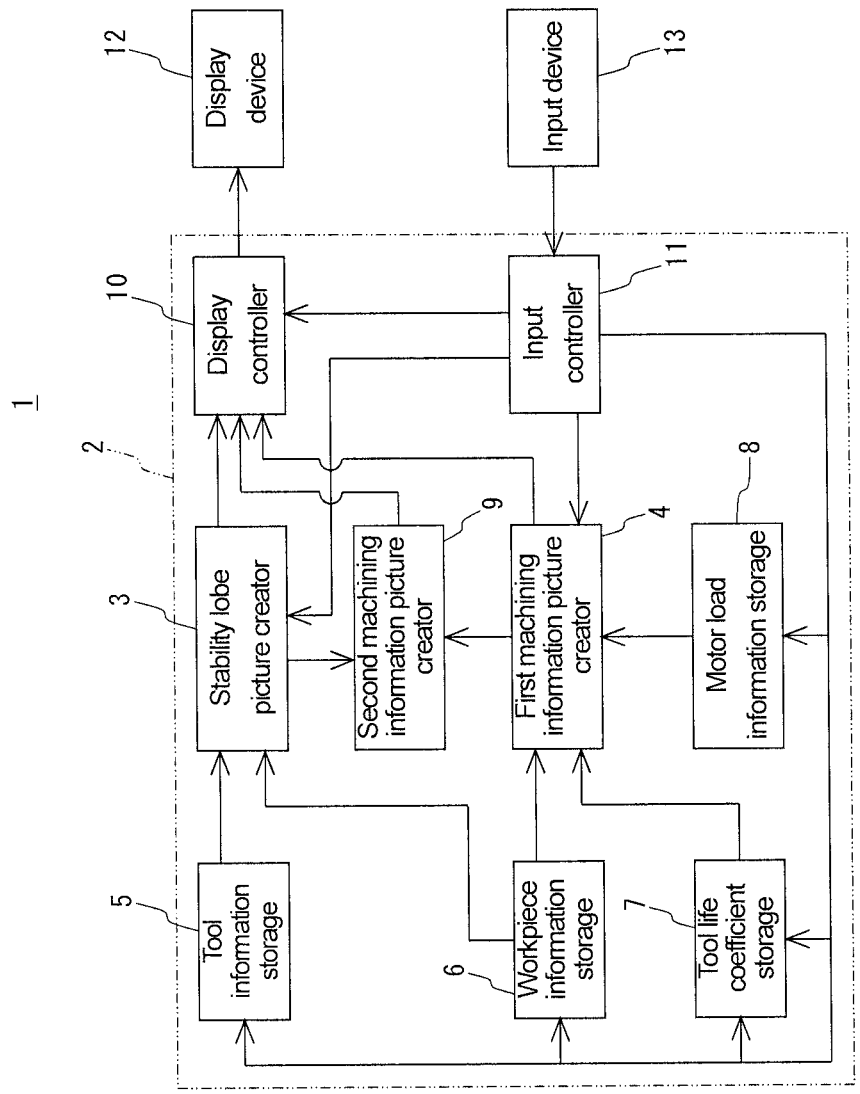
FIG. 1 is a block diagram showing a schematic configuration of a machining status display apparatus according to an embodiment of the present disclosure.

Hereinafter, a specific embodiment of the present disclosure will be described with reference to the drawings. FIG. 1 is a block diagram showing a machining status display apparatus according to this embodiment.

As shown in FIG. 1, the machining status display apparatus 1 according to this embodiment includes a computing device 2, a display device 12, and an input device 13; the computing device 2 has a stability lobe picture creator 3, a first machining information picture creator 4, a tool information storage 5, a workpiece information storage 6, a tool life coefficient storage 7, a motor load information storage 8, a second machining information picture creator 9, a display controller 10, and an input controller 11.

Note that the computing device 2 can be incorporated in a controller of a machine tool, and the display device 12 can be composed of a display provided on an operation panel of the machine tool and the input device 13 can be composed of a keyboard, which is also provided on the operation panel of the machine tool, and an appropriate input and output interface. Alternatively, the display device 12 and the input device 13 can be composed of a touch panel, which is also provided on an operation panel of the machine tool.

Alternatively, the computing device 2 may be composed of a computer having a display as an external device. In this case, the input device 13 is composed of a keyboard provided on the computer, an appropriate input and output interface, and other components, and the display device 12 is composed of the display provided as an external device.

As described above, the computing device 2 can be embodied by a controller of a machine tool, a computer, or the like; the tool information storage 5, the workpiece information storage 6, the tool life coefficient storage 7, and the motor load information storage 8 are composed of a readable and writable storage medium such as an RAM or a hard disk, which is provided on the controller or the computer, and the stability lobe picture creator 3, the first machining information picture creator 4, the second machining information picture creator 9, the display controller 10, and the input controller 11 are composed of a computer program operating on the controller or the computer.

Figure 21:
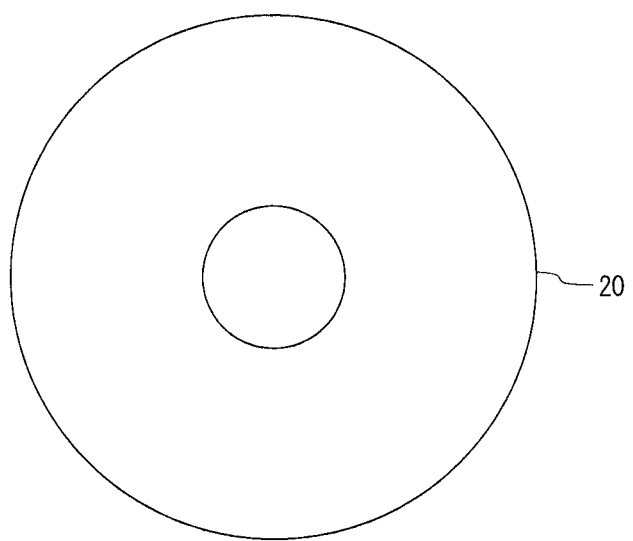
FIG. 21 is a plan view showing a storage medium in the embodiments.

The computer program can be stored in a computer-readable storage medium as appropriate, such as a CD-ROM 20 as shown in FIG. 21, and causing the controller or the computer to read the computer programs from the storage medium to run the computer program on the controller or the computer causes the controller or the computer to function as the computing device 2.

Alternatively, the computer program may be downloaded in the controller or the computer from an appropriate server that provides the computer program, through an appropriate network, such as the internet, and running the computer program on the controller or the computer in which the computer program has been downloaded causes the controller or the computer to function as the computing device 2.

The tool information storage 5, the workpiece information storage 6, the tool life coefficient storage 7, and the motor load information storage 8 store therein necessary information (data) that is input therein through the input device 13.

Each of the above-mentioned components is described in detail below.

The tool information storage 5 is a functional unit that stores information relating to tools used in the machine tool. Specifically, for each tool, information on a tool type, such as end mill, milling cutter, or the like, a tool material, such as CBN, titanium nitride coating, or the like, the number of edges of the tool, a tool diameter [mm], a natural frequency $\omega$ ($\omega_x$, $\omega_y$) [rad/sec] of the tool, a damping ratio $\zeta$($\zeta_x$, $\zeta_y$) [%] of the tool, and an equivalent mass m ($m_x$, $m_y$) [kg] of the tool is input through the input device 13 and stored in the tool information storage 5, for example, in the form of a data table as shown in FIG. 2. Note that the tool material i is stored in a coded form; for example, in FIG. 2, "1" means titanium nitride coating, "2" means titanium carbide coating, and "3" means CBN. Further, as for the natural frequency, the damping ratio, and the equivalent mass, data previously measured for the tool by performing trial machining or the like are stored.

The workpiece information storage 6 is a functional unit that stores information relating to workpieces to be machined in the machine tool. Specifically, a specific cutting resistance of principal force $K_{tj}$ [N/m$^2$] and a ratio of principal force to thrust force $K_{rj}$ [%] corresponding each workpiece material j are previously measured by performing trial machining or the like, and obtained data are stored in the form of a data table as shown in FIG. 3 into the workpiece information storage 6 through the input device 13. Note that the workpiece material j is stored in a coded form; for example, in FIG. 3, "1" means FC150, "2" means FC250, "3" means S45C, and "4" means S60C.

The tool life coefficient storage 7 is a functional unit that stores a tool life coefficient $n_{i,j,h}$ and a tool life coefficient $C_{i,j,h}$ corresponding to the tool material i, the workpiece material j, and a wear limit h; the tool life coefficient $n_{i,j,h}$ and the tool life coefficient $C_{i,j,h}$ are input through the input device 13 and stored in the tool life coefficient storage 7, for example, in the form of a data table as shown in FIGS. 4 and 5.

Note that the wear limit h represents an edge recession amount. In FIGS. 4 and 5, the wear limit h is shown in a coded form; for example, "1" means 0.3 mm, "2" means 0.4 mm, and "3" means 0.5 mm.

The tool life coefficient $n_{i,j,h}$ and the tool life coefficient $C_{i,j,h}$ are coefficients for calculating a tool life t [min], and the tool life t is calculated by the following generalized equation (Equation 1), where V is a cutting speed [m/min].

$$t^n = C/V, \quad \text{(Equation 1)}$$

where $n = n_{i,j,h}$ and $C = C_{i,j,h}$.

The motor load information storage 8 is a functional unit that stores information relating to a correlation between a limit of a load acting on a spindle motor, and a spindle rotation speed n [min$^{-1}$] and a depth of cut $a_p$ [mm] (motor load information); the motor load information is input through the input device 13 and stored into the motor load information storage 8. Note that, as for the load limit, in this embodiment, continuous rating, 15-minute rating, and 25% ED are set. The continuous rating means a motor output which is capable of continuous operation for a predetermined period of time, the 15-minute rating means a motor output which is capable of continuous operation for 15 minutes, and 25% ED means that 25% of a utilization time of the motor is an operation time and 75% thereof is a stop time.

The stability lobe picture creator 3 is a functional unit that obtains (calculates), based on the specifications of a tool to be used, first correlation data relating to a correlation between the spindle rotation speed and a limit depth of cut of the tool above which regenerative chatter occurs, and creates, based on the calculated first correlation data, display picture data for displaying a stability lobe that is a correlation diagram between the spindle rotation speed and the limit depth of cut. Note that the stability lobe in this embodiment is in accordance with the so-called theory of stable pocket.

Figure 16:
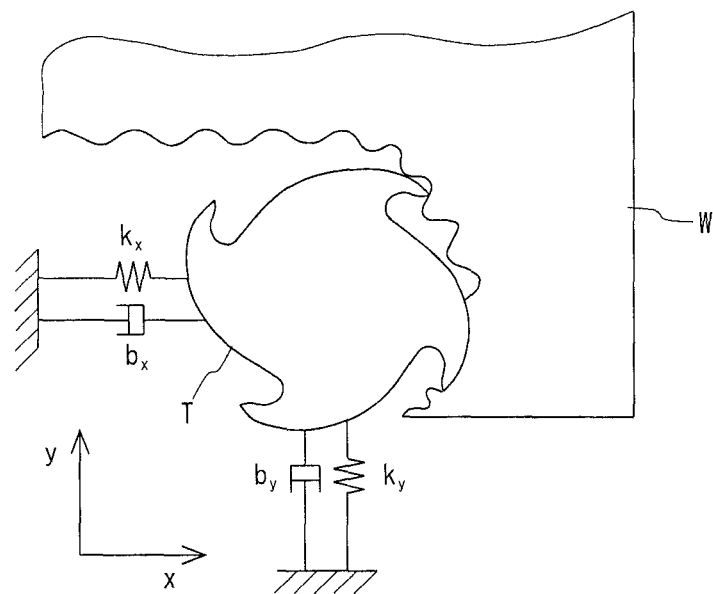
FIG. 16 is an illustration showing a cutting model having a system with two degrees of freedom.

First, the basic principles for calculating the first correlation data relating to the correlation between the spindle rotation speed and the limit depth of cut above which regenerative chatter occurs, that is, the basic principles for creating the stability lobe are explained. The model shown in FIG. 16 is a physical model having a system with two degrees of freedom, which is configured to relatively move a tool T and a workpiece W in two feed axis directions: an x axis direction and a y axis direction. Based on this model, conditions which cause regenerative chatter vibration are obtained using the analysis method devised by Y. Altintas.

In this model, the equations of motion for the tool T are represented by the following equations 2 and 3.

$$x'' + 2\zeta_x \omega_x x' + \omega_x^2 x = F_x/m_x \quad \text{(Equation 2)}$$

$$y'' + 2\zeta_y \omega_y y' + \omega_y^2 y = F_y/m_y. \quad \text{(Equation 3)}$$

In these equations, $\omega_x$ is a natural frequency [rad/sec] in the x axis direction of the tool T, $\omega_y$ is a natural frequency [rad/sec] in the y axis direction of the tool T, $\zeta_x$ is a damping ratio [%] in the x axis direction (feed direction), and $\zeta_y$ is a damping ratio [%] in the y axis direction (cutting direction). Further, $m_x$ is an equivalent mass [kg] in the x axis direction, $m_y$ is an equivalent mass [kg] in the y axis direction, $F_x$ is a cutting force [N] in the x axis direction applied to the tool T, and $F_y$ is a cutting force [N] in the y axis direction applied to the tool T. Furthermore, x" and y" each represent a second-order derivative with respect to time and x' and y' each represent a first-order derivative with respect to time.

The cutting forces $F_x$ and $F_y$ can be calculated by the following equations 4 and 5, respectively:

$$Fx = -Kt a_p h(\varphi)\cos(\varphi) - K_r K t a_p h(\varphi)\sin(\varphi); \text{ and} \quad \text{(Equation 4)}$$

$$Fy = +Kt a_p h(\varphi)\sin(\varphi) - K_r K t a_p h(\varphi)\cos(\varphi). \quad \text{(Equation 5)}$$

In these equations, $h(\varphi)$ [m$^2$] is a thickness with which an cutting edge cuts the workpiece W, $a_p$ [mm] is a depth of cut, $K_t$ [N/m$^2$] is a specific cutting resistance of principal force, and $K_r$ [%] is a ratio of principal force to thrust force.

The cutting forces $F_x$ and $F_y$ change in accordance with an angle of rotation $\varphi$ [rad] of the tool T; therefore, the cutting forces $F_x$ and $F_y$ can be respectively obtained by integrating the cutting forces $F_x$ and $F_y$ between an angle $\varphi_{st}$ at which cutting is started and an angle $\varphi_{ex}$ at which the cutting is ended and calculating the average thereof. Further, the angle $\varphi_{st}$ and the angle $\varphi_{ex}$ can be geometrically determined based on a diameter D [mm] of the tool T, a width of cut Ae [mm], a feed direction, and whether the cutting is upper cut or down cut.

An eigenvalue $\Lambda$ of the above equations 2 and 3 is represented by the following equation 6:

$$\Lambda = -(a_1 \pm (a_1^2 - 4a_0)^{1/2})/2a_0, \quad \text{(Equation 6)}$$

where
$a_0 = \Phi_{xx}(i\omega_c)\Phi_{yy}(i\omega_c)(\alpha_{xx}\alpha_{yy} - \alpha_{xy}\alpha_{yx})$,
$a_1 = \alpha_{xx}\Phi_{xx}(i\omega_c) + \alpha_{yy}\Phi_{yy}(i\omega_c)$,
$\Phi_{xx}(i\omega_c) = 1/(m_x(-\omega_c^2 + 2i\zeta_x\omega_c\omega_x + \omega_x^2))$,
$\Phi_{yy}(i\omega_c) = 1/(m_y(-\omega_c^2 + 2i\zeta_y\omega_c\omega_y + \omega_y^2))$,
$\alpha_{xx} = [(\cos 2\varphi_{ex} - 2K_r\varphi_{ex} + K_r \sin 2\varphi_{ex}) - (\cos 2\varphi_{st} - 2K_r\varphi_{st} + K_r \sin 2\varphi_{st})]/2$,
$\alpha_{xy} = [(-\sin 2\varphi_{ex} - 2\varphi_{ex} + K_r \cos 2\varphi_{ex}) - (-\sin 2\varphi_{st} - 2\varphi_{st} + K_r \cos 2\varphi_{st})]/2$,
$\alpha_{yx} = [(-\sin 2\varphi_{ex} + 2\varphi_{ex} + K_r \cos 2\varphi_{ex}) - (-\sin 2\varphi_{st} + 2\varphi_{st} K_r \cos 2\varphi_{st})]/2$, and
$\alpha_{yy} = [(-\cos 2\varphi_{ex} - 2K_r\varphi_{ex} - K_r \sin 2\varphi_{ex}) - (\cos 2\varphi_{st} - 2K_r\varphi_{st} - K_r \sin 2\varphi_{st})]/2$.

In these equations, $\omega_c$ is a frequency of chatter vibration.

When a real part and an imaginary part of the eigenvalue $\Lambda$ are represented by $\Lambda_R$ and $\Lambda_I$, respectively, a depth of cut $a_{plim}$ and a spindle rotation speed $n_{lim}$ at a stability limit are represented by the following equations 7 and 8, respectively:

$$a_{plim} = 2\pi\Lambda_R(1 + (\Lambda_I/\Lambda_R)^2)/(NK_t); \text{ and} \quad \text{(Equation 7)}$$

$$n_{lim} = 60\omega_c/(N(2k\pi + \pi - 2 \tan^{-1}(\Lambda_I/\Lambda_R))). \quad \text{(Equation 8)}$$

In these equations, N is the number of edges of the tool T and k is an integer.

By calculating the limit depth of cut $a_{plim}$ and the spindle rotation speed $n_{lim}$ in accordance with the above equations 7 and 8 while changing the values of $\omega_c$ and k in the equations in a predetermined manner, a stability lobe can be created.

Thus, a stability lobe can be created by calculating the real part $\Lambda_R$ and the imaginary part $\Lambda_I$ of the eigenvalue $\Lambda$ in accordance with the above equation 6 based on the natural frequencies $\omega_x$ and $\omega_y$, the specific cutting resistance of principal force $K_t$, the ratio of principal force to thrust force $K_r$, the damping ratios $\zeta_x$ and $\zeta_y$, and the equivalent masses $m_x$ and $m_y$, and then calculating the limit depth of cut $a_{plim}$ and the spindle rotation speed $n_{lim}$ in accordance with the above equations 7 and 8 while changing the values of $\omega_x$ and k of the equations in a predetermined manner.

Specifically, the stability lobe picture creator 3 starts its processing upon receiving a processing start signal that is input through the input device 13. Based on tool information (for example, the above-mentioned tool number) and workpiece information (for example, information on the above-mentioned workpiece material) that are input by the operator, the stability lobe picture creator 3 reads out data on the number of edges, tool diameter D, natural frequencies $\omega_x$ and $\omega_y$, damping ratios $\zeta_x$ and $\zeta_y$, and equivalent masses $m_x$ and $m_y$ corresponding to the input tool number from the information stored in the tool information storage 5, and reads out data on the specific cutting resistance of principal force $K_t$ and the ratio of principal force to thrust force $K_r$, corresponding to the input workpiece material from the information stored in the workpiece information storage 6.

Subsequently, the stability lobe picture creator 3 calculates the real part $\Lambda_R$ and the imaginary part $\Lambda_I$ of the eigenvalue $\Lambda$ in accordance with the above equation 6 based on the read-out number of edges, tool diameter D, natural frequencies $\omega_x$ and $\omega_y$, specific cutting resistance of principal force $K_t$, ratio of principal force to thrust force $K_r$, damping ratios $\zeta_x$ and $\zeta_y$, and equivalent masses $m_x$ and $m_y$. Thereafter, the stability lobe picture creator 3 calculates the limit depth of cut $a_{plim}$ and the spindle rotation speed $n_{lim}$ in accordance with the above equations 7 and 8 while changing the values of $\omega_x$ and k in the equations in a predetermined manner, that is, calculates the first correlation data relating to the correlation between the limit depth of cut $a_{plim}$ and the spindle rotation speed $n_{lim}$, and then creates display picture data for displaying a stability lobe that is a correlation diagram between the spindle rotation speed $n_{lim}$ and the limit depth of cut $a_{plim}$ of the tool above which regenerative chatter occurs.

Note that the damping ratios $\zeta x$ and $\zeta y$, which are stored in the tool information storage 5, can be calculated, for example by the following equations 9 and 10, respectively:

$$\zeta_x=(\omega_{1x}-\omega_{2x})/2\omega_x; \text{ and} \qquad \text{(Equation 9)}$$

$$\zeta_y=(\omega_{1y}-\omega_{2y})/2\omega_y, \qquad \text{(Equation 10)}$$

wherein $\omega_x$ is the natural frequency in the x axis direction of the tool T and $\omega_y$ is the natural frequency in the y axis direction of the tool T.

Figure 17:
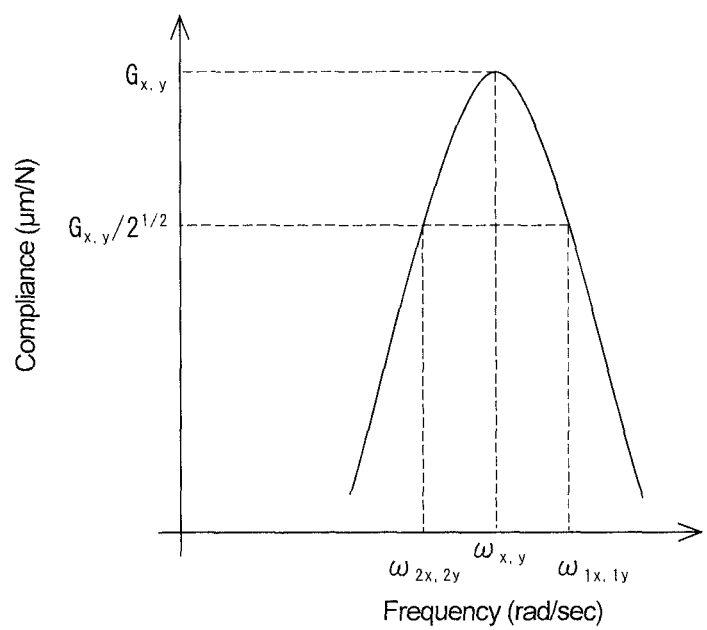
FIG. 17 is an illustration for explaining calculation of a damping ratio.

Note that, as shown in FIG. 17, $\omega_{1x}$ and $\omega_{2x}$ are frequencies corresponding to $G_x/2^{1/2}$ when the largest value of a compliance (displacement (=output)/cutting force (=input)) in the x axis direction is $G_x$, and $\omega_{1y}$ and $\omega_{2y}$ are frequencies corresponding to $G_y/2^{1/2}$ when the largest value of a compliance in the y axis direction is $G_y$, and the frequency when the compliance in the x axis direction is the largest value $G_x$ and the frequency when the compliance in the y axis direction is the largest value $G_y$ are the natural frequencies $\omega_x$ and $\omega_y$ of the tool T, respectively.

Further, the equivalent masses $m_x$ and $m_y$ can be calculated by the following equations 11 and 12, respectively:

$$m_x=1/(2G_x\zeta_x\omega_x^2); \text{ and} \qquad \text{(Equation 11)}$$

$$m_y=1/(2G_y\zeta_y\omega_y^2). \qquad \text{(Equation 12)}$$

The first machining information picture creator 4 is a functional unit that creates display picture data for displaying information relating to a cutting efficiency, information relating to a tool life of a tool to be used, information relating to a total cutting amount a tool to be used is able to cut before reaching the end of its tool life, and information relating to a load acting on the spindle motor. The first machining information picture creator 4 starts its processing upon receiving the processing start signal that is input from the input device 13; the first machining information picture creator 4 creates display picture data for displaying information selected from the above-mentioned pieces of information in accordance with a selection signal that is input from the input device 13.

Specifically, for example, as for the cutting efficiency, the first machining information picture creator 4 calculates (obtains) a cutting efficiency E [cc/min] corresponding to the spindle rotation speed n [min$^{-1}$] and the depth of cut $a_p$ [mm] in accordance with the equation 13 below based on a feed amount per edge f [mm] of a tool and a width of cut Ae [mm] of the tool, which are input through the input device 13, and creates display picture data for displaying a diagram therefor. Note that the cutting efficiency relates to the same tool as the tool the stability lobe created by the stability lobe picture creator 3 relates to, and the number of edges in the equation 13 below is read out from the tool information storage 5.

$$E=f \times Ae \times (\text{the number of edges}) \times n \times a_p \qquad \text{(Equation 13)}$$

Further, the tool life also relates to the same tool as the tool the stability lobe created by the stability lobe picture creator 3 relates to. Based on the tool number input through the input device 13 at the time of the creation of the stability lobe, the first machining information picture creator 4 obtains information on the tool material i corresponding to the input tool number from the information stored in the tool information storage 5. Further, based on the obtained information on the tool material i, the information on the workpiece material j that is input through the input device 13, and information on the wear limit h that is input in addition to the tool number and the workpiece material through the input device 13, the first machining information picture creator 4 reads out the corresponding tool life coefficients $n_{i,j,h}$ and $C_{i,j,h}$ from the information stored in the tool life coefficient storage 7. Subsequently, the first machining information picture creator 4 calculates (obtains), in accordance with the above equation 1, the tool life t [min] of the tool for the case where machining is performed with a predetermined spindle rotation speed, and creates display picture data for displaying the obtained relationship between the tool life t and the spindle rotation speed n.

Note that the cutting speed V [m/min] in the equation 1 is calculated based on the tool diameter D [mm] of the tool (number) and the spindle rotation speed n [min$^{-1}$]. In this connection, the equation for this calculation is as follows:

$$V=\pi \times D \times n/1000 \qquad \text{(Equation 14)}$$

Further, as for the total cutting amount $C_v$ [cc] a tool is able to cut before reaching the end of its tool life, the first machining information picture creator 4 calculates (obtains) the cutting efficiency E [cc/min] in accordance with the equation 13 and calculates (obtains) the tool life t [min] in accordance with the equation 1, and then creates a diagram showing a correlation between the spindle rotation speed n [min$^{-1}$] and depth of cut $a_p$ [mm] and the total cutting amount $C_v$ [cc] in accordance with the equation 15 below based on the obtained cutting efficiency E and tool life t and creates display picture data for displaying the diagram.

$$C_v=E \times t \qquad \text{(Equation 15)}$$

Note that the feed amount per edge f [mm] and the width of cut Ae [mm], which are used for calculating the cutting efficiency E [cc/min], are input through the input device 13 as described above. Further, the number of edges is read out from the tool information storage 5 based on the tool number input at the time of creation of the stability lobe in the stability lobe picture creator 3. Further, the tool life coefficients $n_{i,j,h}$ and $C_{i,j,h}$, which are used for calculating the tool life t, are read out from the information stored in the tool life coefficient storage 7 based on information on the tool material i obtained from the tool information storage 5 based on the tool number, information on the workpiece material j input through the input device 13, and information on the wear limit h input through the input device 13. Further, the cutting speed V [m/min] is calculated in accordance with the equation 14 based on the tool diameter D [mm] of the tool (number) and the spindle rotation speed n [min$^{-1}$].

Further, as for the information relating to the load acting on the spindle motor, the first machining information picture creator 4 creates a diagram showing a correlation between a limit of the load acting on the spindle motor and the spindle rotation speed n [min$^{-1}$] and depth of cut $a_p$ [mm] by referring to (obtaining) the information stored in the motor load information storage 8, and creates display picture date for displaying the diagram. Note that, in this embodiment, continuous rating, 15-minute rating, and 25% ED are set as the load limit.

The second machining information picture creator 9 is a functional unit that obtains (calculates) second correlation data relating to a correlation between the spindle rotation speed and the machining related information in machining with the limit depth of cut based on the first correlation data obtained by the stability lobe picture creator 3 and the machining related information obtained by the first machining information picture creator 4, and creates display picture data for displaying a diagram showing the correlation between the spindle rotation speed and the machining related information based on the obtained second correlation data.

The display controller 10 carries out a processing of, based on the display picture data created by the stability lobe picture creator 3 and the display picture data created by the first machining information picture creator 4, displaying a display picture relating to the stability lobe created by the stability lobe picture creator 3 and a display picture relating to the machining related information created by the first machining information picture creator 4 with the display pictures superimposed one on another on the display screen of the display device 12, and a processing of, based on the display picture data created by the second machining information picture creator 9, displaying a correlation diagram between the spindle rotation speed and the machining related information on the display screen of the display device 12.

The input controller 11 controls inputs from the input device 13, and transmits data input from the input device 13 to the stability lobe picture creator 3, the first machining information picture creator 4, the tool information storage 5, the workpiece information storage 6, the tool life coefficient storage 7, or the motor load information storage 8.

In the machining status display apparatus 1 according to this embodiment having the above-described configuration, once a processing start signal is input from the input device 13, the stability lobe picture creator 3 and the first machining information picture creator 4 start their respective processings for creating display picture data.

Based on a tool number and information on the workpiece material that are additionally input from the input device 13, the stability lobe picture creator 3 reads out data on the number of edges, tool diameter D, natural frequencies $\omega_x$ and $\omega_y$, damping ratios $\zeta_x$ and $\zeta_y$, and equivalent masses $m_x$ and $m_y$, corresponding to the input tool number from the information stored in the tool information storage 5 and reads out data on the specific cutting resistance of principal force $K_t$ and the ratio of principal force to thrust force $K_r$ corresponding to the input workpiece material from the information stored in the workpiece information storage 6. Based on the read-out number of edges, tool diameter D, natural frequencies $\omega_x$ and $\omega_y$, specific cutting resistance of principal force $K_t$, ratio of principal force to thrust force $K_r$, damping ratios $\zeta_x$ and $\zeta_y$, and equivalent masses $m_x$ and $m_y$, the stability lobe picture creator 3 calculates the real part $\Lambda_R$ and the imaginary part $\Lambda_I$ of the eigenvalue $\Lambda$ in accordance with the equation 6. Subsequently, the stability lobe picture creator 3 calculates the limit depth of cut $a_{plim}$ and the spindle rotation speed $n_{lim}$ in accordance with the equations 7 and 8 while changing the values of $\omega_c$ and k in the equations in a predetermined manner, that is, calculates the first correlation data relating to the correlation between the limit depth of cut $a_{plim}$ and the spindle rotation speed $n_{lim}$, and creates display picture data for displaying a stability lobe that is a correlation diagram between the spindle rotation speed $n_{lim}$ and the limit depth of cut $a_{plim}$ of the tool above which regenerative chatter occurs.

Meanwhile, the first machining information picture creator 4 creates display picture data for displaying one or more pieces of information selected through the input device 13. The display picture data the first machining information picture creator 4 is able to create are display picture data for the cutting efficiency E, display picture data for the tool life t, display picture data for the total cutting amount $C_v$, and display picture data for the load acting on the spindle motor; the first machining information picture creator 4 creates display picture data for one or more pieces of information selected through the input device 13 by the operator.

In this process, in the case of creating display picture data for the cutting efficiency E, a feed amount per edge f of the tool and a width of cut Ae of the tool are input from the input device 13; in the case of creating display picture data for the tool life t, a wear limit his input from the input device 13; and in the case of creating display picture data for the total cutting amount $C_v$, a feed amount per edge f of the tool, a width of cut Ae of the tool, and a wear limit h are input from the input device 13 as necessary.

When the stability lobe picture creator 3 and the first machining information picture creator 4 have created their respective display picture data, the created display picture data are transmitted to the display controller 10 and the display controller 10 displays the display pictures with the display pictures superimposed one on another on the display screen of the display device 12.

Examples of the display pictures displayed on the display screen of the display device 12 in the above-described manner are shown in FIGS. 6 to 15. Note that the display pictures shown in FIGS. 6 to 15 are each displayed on the display device 12 by being selected as appropriate by the operator.

Figure 6:
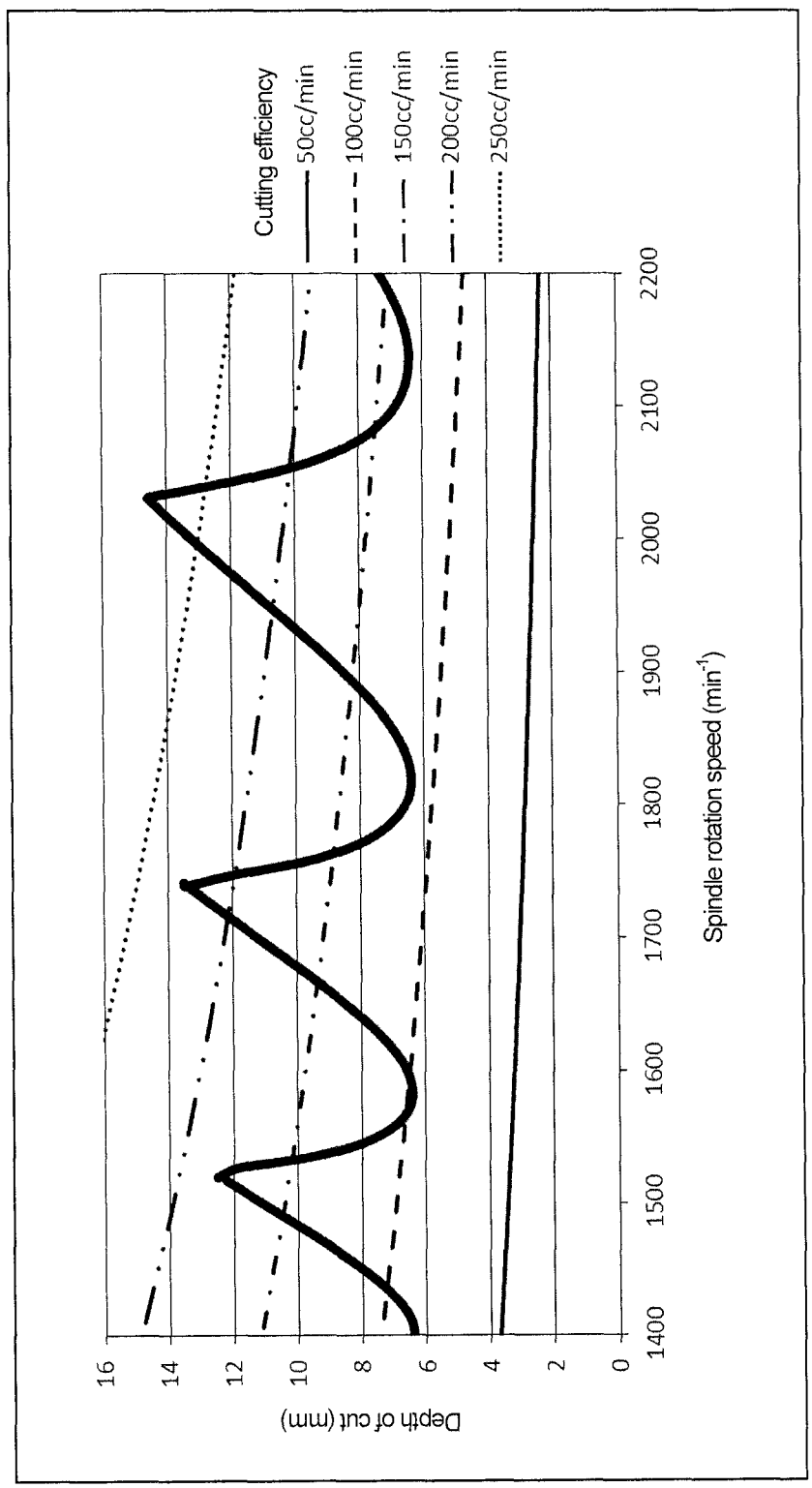
FIG. 6 is an illustration showing an example of display pictures displayed on a display device in the embodiment.

FIG. 6 shows a stability lobe (the waveform diagram depicted with a bold solid line) and a diagram for the cutting efficiency, which are displayed in a mutually superimposed manner. Note that, as for the cutting efficiency, a relationship between the spindle rotation speed and the depth of cut which provides a cutting efficiency of 50 [cc/min] is depicted with a thin solid line, a relationship which provides a cutting efficiency of 100 [cc/min] is depicted with a thin broken line, a relationship which provides a cutting efficiency of 150 [cc/min] is depicted with a thin one-dot chain line, a relationship which provides a cutting efficiency of 200 [cc/min] is depicted with a thin two-dot chain line, and a relationship which provides a cutting efficiency of 250 [cc/min] is depicted with a thin dotted line. By looking at these display pictures, the operator can quickly recognize a spindle rotation speed and a depth of cut which provide the highest cutting efficiency within a range where no regenerative chatter occurs (the area below the waveform diagram depicted with the bold solid line).

Figure 7:
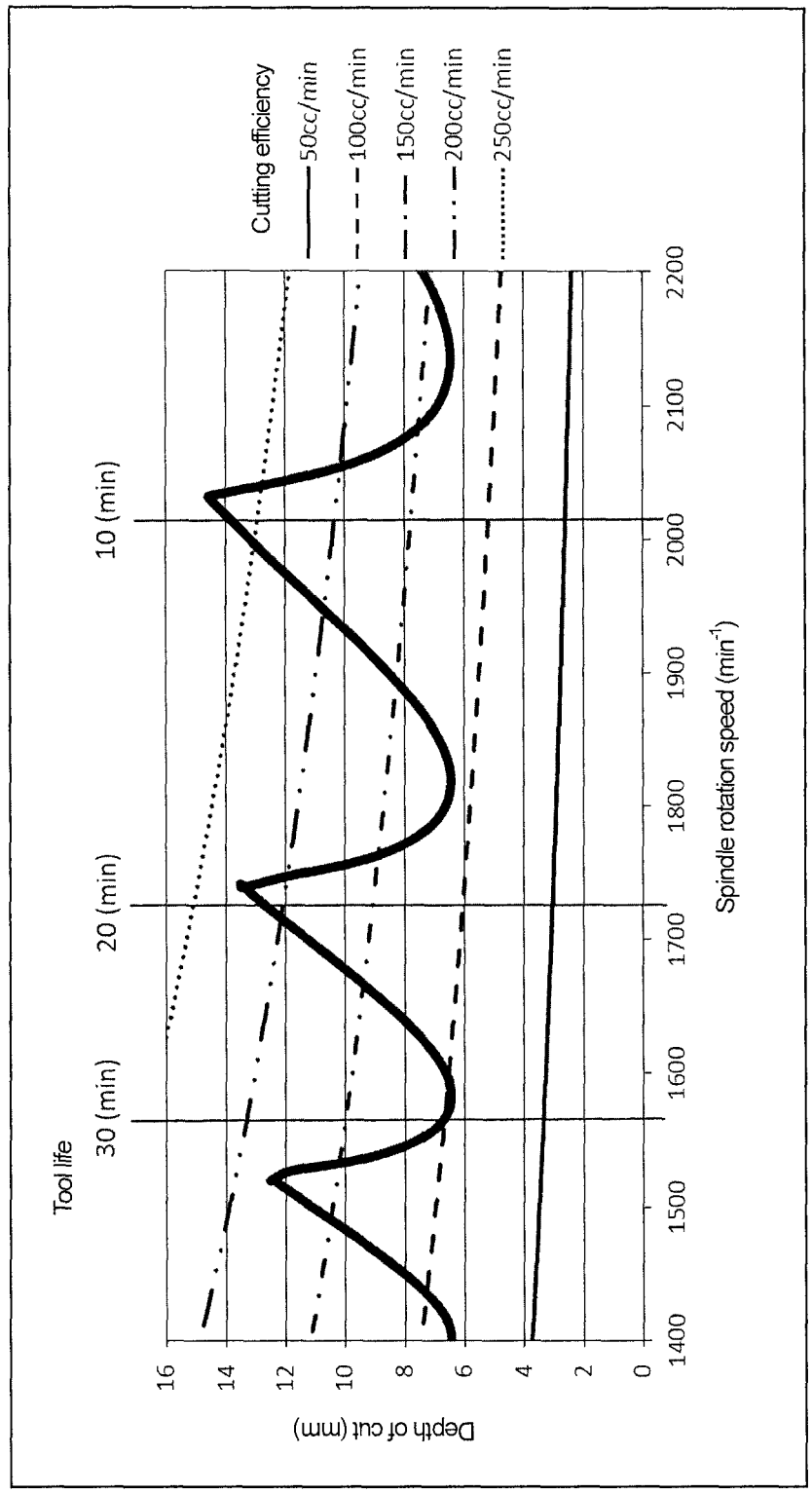
FIG. 7 is an illustration showing an example of the display pictures displayed on the display device in the embodiment.

FIG. 7 shows a diagram for the tool life in addition to the stability lobe (the waveform diagram depicted with a bold solid line) and diagram for the cutting efficiency shown in FIG. 6, which are displayed in a mutually superimposed manner. Note that the diagram for the tool life has a configuration in which vertical lines are arranged at positions corresponding to spindle rotation speeds which respectively provide a tool life of 30 [min], a tool life of 20 [min], and a tool life of 10 [min] and numerals related to the tool life are arranged near each of the vertical lines. By looking at these display pictures, the operator can recognize a correlation between the regenerative chatter, the cutting efficiency, and the tool life; therefore, for example, the operator can quickly recognize a spindle rotation speed and a depth of cut which provide an appropriate tool life and a preferable cutting efficiency within the range where no regenerative chatter occurs.

Figure 8:
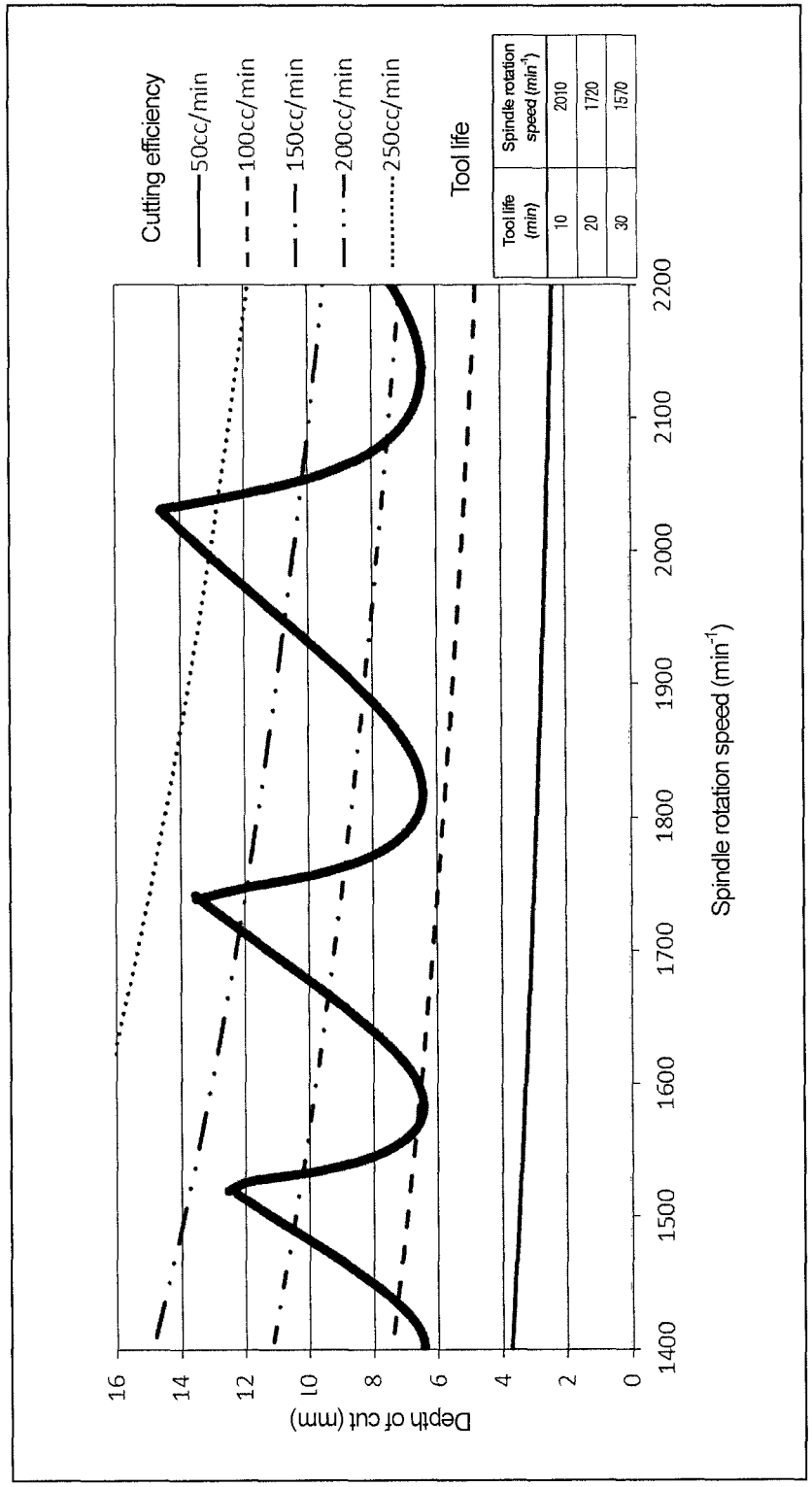
FIG. 8 is an illustration showing an example of the display pictures displayed on the display device in the embodiment.

Similarly to FIG. 7, FIG. 8 shows a table showing a relationship between the tool life and the spindle rotation speed in addition to the stability lobe (the waveform diagram depicted with a bold solid line) and diagram for the cutting efficiency shown in FIG. 6, which are displayed in a mutually superimposed manner. These display pictures also allow the operator to recognize the correlation between the regenerative chatter, the cutting efficiency, and the tool life; therefore, for example, the operator can recognize a spindle rotation speed and a depth of cut which provide an appropriate tool life and a preferable cutting efficiency within the range where no regenerative chatter occurs.

Figure 9:
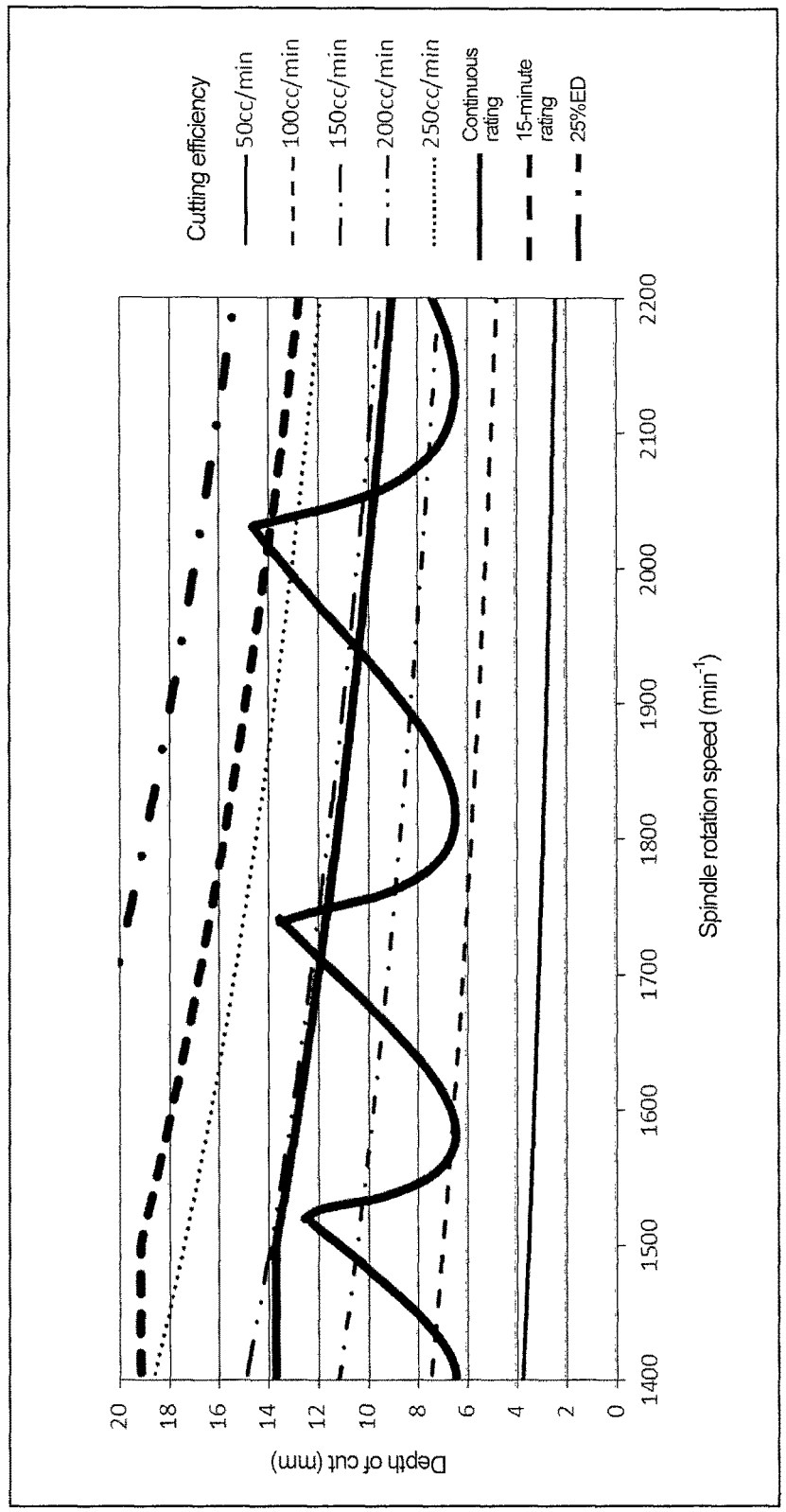
FIG. 9 is an illustration showing an example of the display pictures displayed on the display device in the embodiment.

FIG. 9 shows a diagram showing a correlation between the limit of the load acting on the spindle motor and the spindle rotation speed and depth of cut in addition to the stability lobe (the waveform diagram depicted with a bold solid line) and diagram for the cutting efficiency shown in FIG. 6, which are displayed in a mutually superimposed manner. Note that a relationship between the spindle rotation speed and the depth of cut for the case where the load acting on the spindle motor is set to the continuous rating is depicted with a bold solid line, a relationship for the case of the 15-minute rating is depicted with a bold broken line, and a relationship for the case of the 25% ED is depicted with a bold one-dot chain line. By looking at these display pictures, the operator can recognize a correlation between the regenerative chatter, the cutting efficiency, and the spindle motor load; therefore, for example, the operator can quickly recognize a spindle rotation speed and a depth of cut which provide a preferable cutting efficiency within a range where no regenerative chatter occurs and the spindle motor load is in a predetermined state (for example, a state of being on or below the continuous rating).

Figure 10:
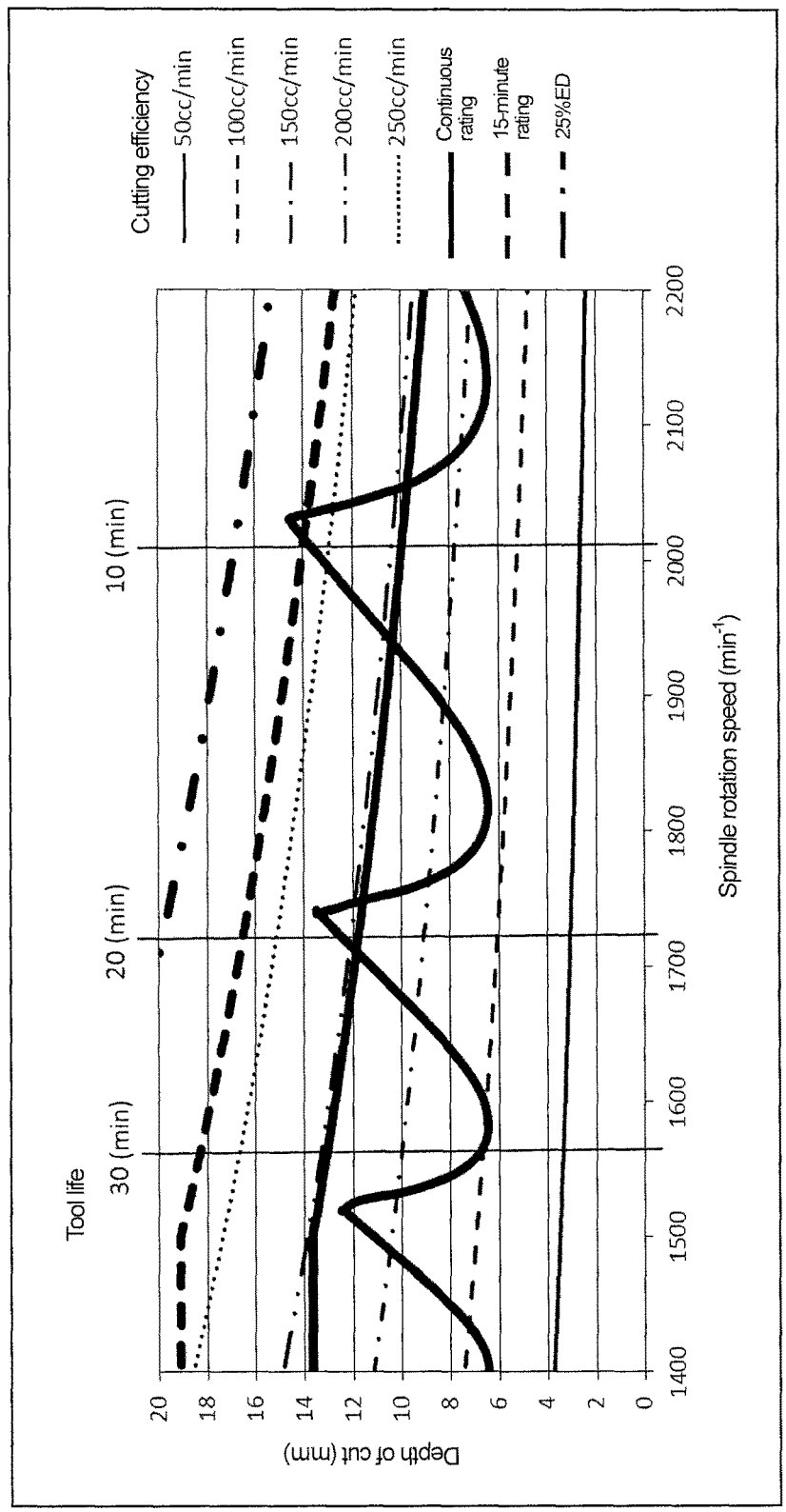
FIG. 10 is an illustration showing an example of the display pictures displayed on the display device in the embodiment.

FIG. 10 shows a diagram showing a correlation between the limit of the load acting on the spindle motor and the spindle rotation speed and depth of cut in addition to the stability lobe (the waveform diagram depicted with a bold solid line), diagram for the cutting efficiency, and diagram for the tool life shown in FIG. 7, which are displayed in a mutually superimposed manner. By looking at these display pictures, the operator can recognize a correlation between the regenerative chatter, the cutting efficiency, the tool life, and the spindle motor load; therefore, the operator can quickly recognize a spindle rotation speed and a depth of cut which provide an appropriate tool life and a more preferable cutting efficiency within the range where no regenerative chatter occurs and the spindle motor load is in a predetermined state (for example, a state of being on or below the continuous rating).

For example, in a case where machining is to be performed with the depth of cut set to 10 [mm], by looking at the displayed stability lobe, the operator can recognize a spindle rotation speed which enables stable machining with the depth of cut of 10 [mm] is approximately 1500 approximately 1720 [min$^{-1}$], or approximately 2000 [min$^{-1}$]. However, the operator cannot recognize which one of these spindle rotation speeds is the most appropriate, from only the stability lobe.

Therefore, the operator uses the diagram showing the correlation between the cutting efficiency and the spindle rotation speed and depth of cut, the diagram showing the correlation between the tool life and the spindle rotation speed, and the diagram showing the correlation between the limit of the load acting on the spindle motor and the spindle rotation speed and depth of cut, which are displayed in a mutually superimposed manner in FIG. 10, to recognize the most appropriate spindle rotation speed.

That is, for example, the operator first narrows down the spindle rotation speeds to a speed such that the motor load does not exceed the continuous rating (the bold solid line). Specifically, with respect to the spindle rotation speeds selected in the above-described manner, 2000 [min$^{-1}$] exceeds the continuous rating; therefore, 2000 [min$^{-1}$] is excluded, whereby the spindle rotation speeds of 1500 [min$^{-1}$] and 1720 [min$^{-1}$] are selected out.

Subsequently, the operator weighs the spindle rotation speeds in appropriateness based on the diagram for the cutting efficiency and the diagram for the tool life, thereby determining a spindle rotation speed which is judged to be the most appropriate in view of the cutting efficiency and the tool life. For example, in respect of the cutting efficiency, the cutting efficiency when the spindle rotation speed is 1500 [min$^{-1}$] is 145 [cc/min], while the cutting efficiency when the spindle rotation speed is 1720 [min$^{-1}$] is 170 [cc/min]. On the other hand, in respect of the tool life, the tool life when the spindle rotation speed is 1500 [min$^{-1}$] is 35 [min], while the tool life when the spindle rotation speed is 1720 [min$^{-1}$] is 20 [min]. Based on these results, the operator selects 1720 [min$^{-1}$] as the most appropriate spindle rotation speed when regarding the cutting efficiency as important, while the operator selects 1500 [min$^{-1}$] as the most appropriate spindle rotation speed when regarding the tool life as important.

In the above-described manner, the operator can recognize the most appropriate spindle rotation speed under his assumed cutting conditions from the diagrams shown in FIG. 10.

Figure 11:
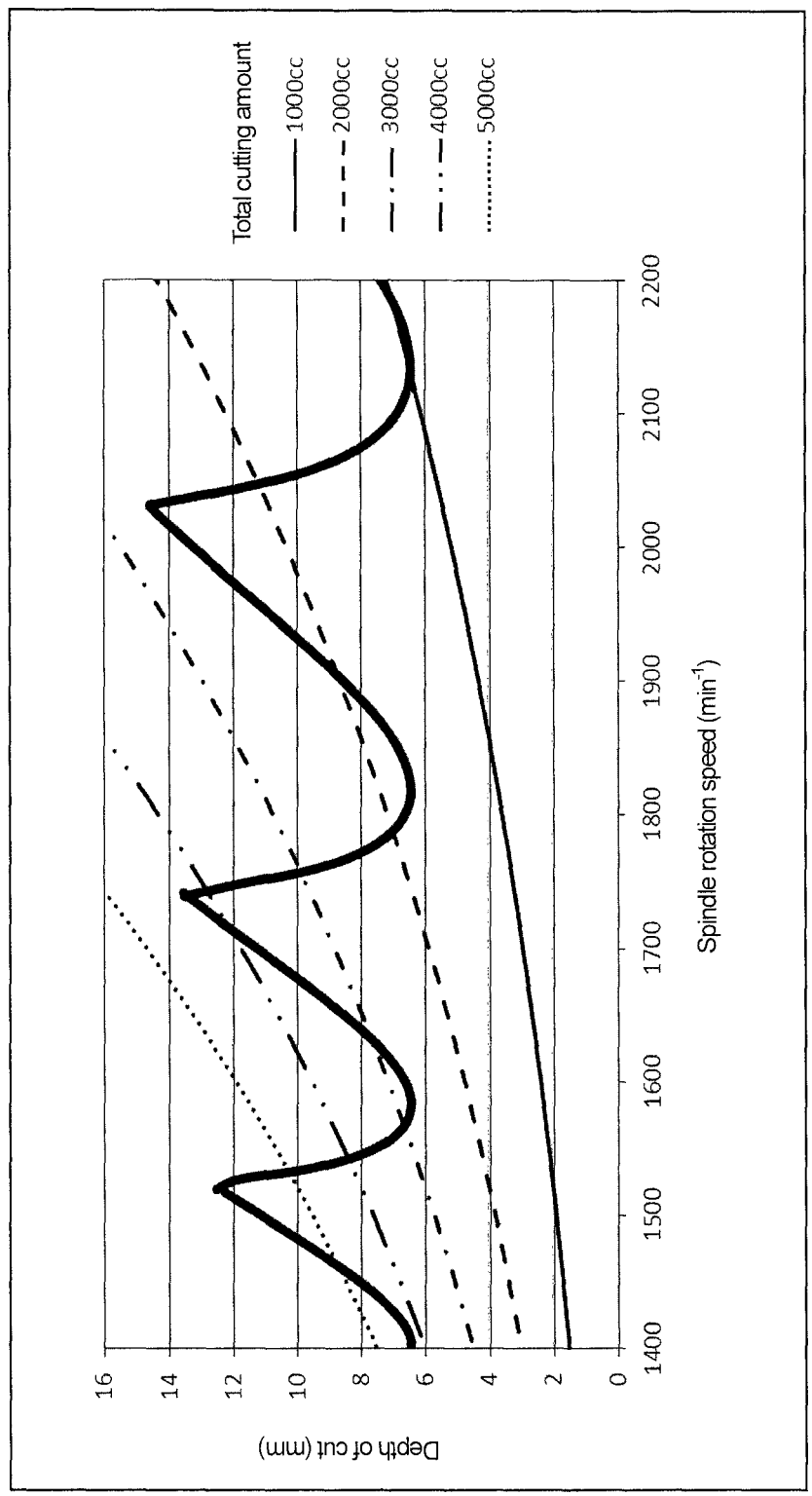
FIG. 11 is an illustration showing an example of the display pictures displayed on the display device in the embodiment.

Further, FIG. 11 shows a stability lobe (the waveform diagram depicted with a bold solid line) and a diagram for the total cutting amount, which are displayed in a mutually superimposed manner. Note that, as for the total cutting amount, a relationship between the spindle rotation speed and the depth of cut which provides a total cutting amount of 1000 [cc] is depicted with a thin solid line, a relationship which provides a total cutting amount of 2000 [cc] is depicted with a thin broken line, a relationship which provides a total cutting amount of 3000 [cc] is depicted with a thin one-dot chain line, a relationship which provides a total cutting amount of 4000 [cc] is depicted with a two-dot chain line, and a relationship which provides a total cutting amount of 5000 [cc] is depicted with a thin dotted line. By looking at these display pictures, the operator can quickly recognize a spindle rotation speed and a depth of cut which provide a preferable total cutting amount within the range where no regenerative chatter occurs.

Figure 12:
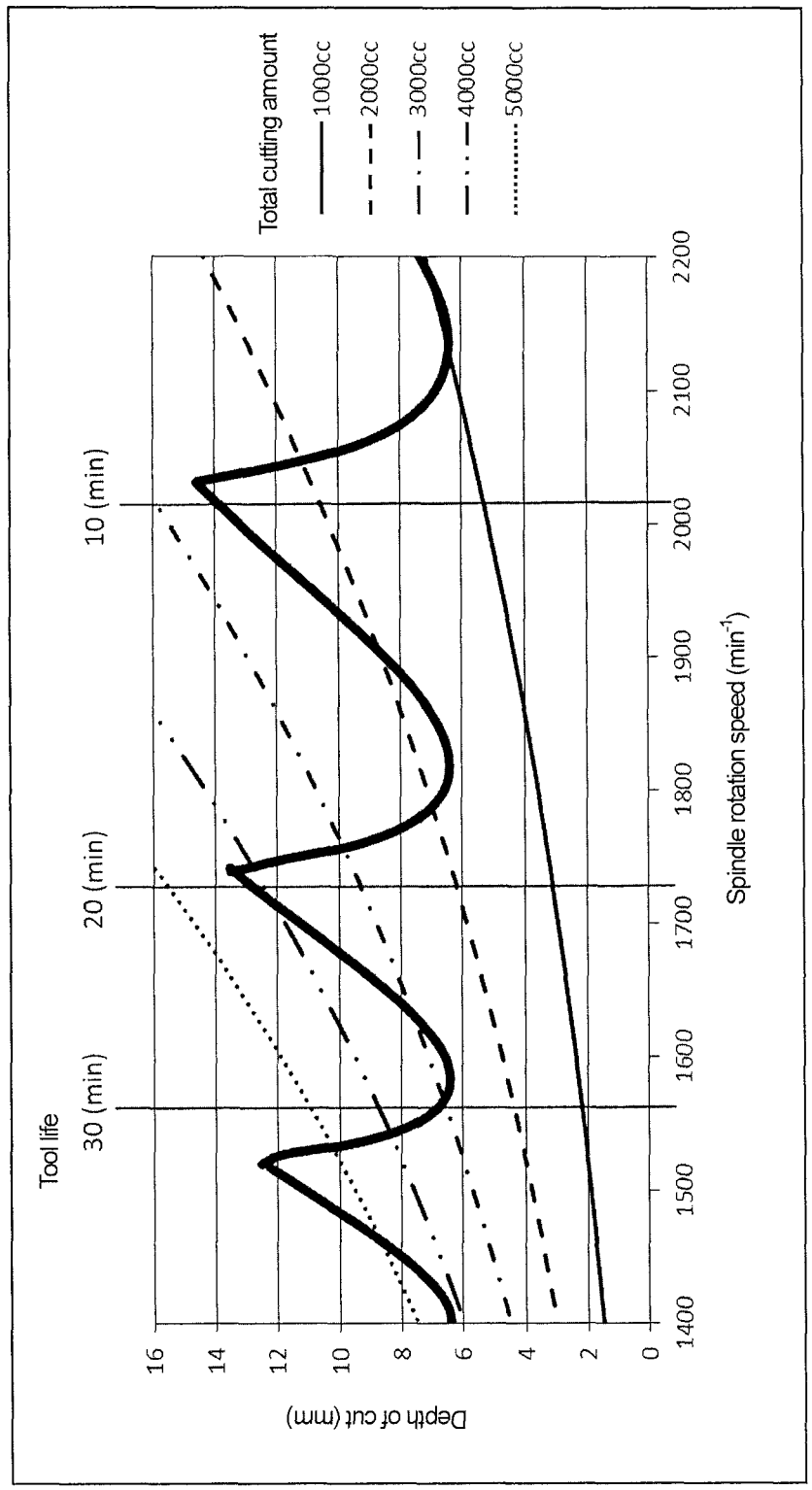
FIG. 12 is an illustration showing an example of the display pictures displayed on the display device in the embodiment.

FIG. 12 shows a diagram for the tool life in addition to the stability lobe (the waveform diagram depicted with a bold solid line) and diagram for the total cutting amount shown in FIG. 11, which are displayed in a mutually superimposed manner. The diagram for the tool life has, similarly to the diagram for the tool life shown in FIG. 7, a configuration in which vertical lines are arranged at positions corresponding to spindle rotation speeds which respectively provide a tool life of 30 [min], a tool life of 20 [min], and a tool life of 10 [min] and numerals related to the tool life are arranged near each of the vertical lines. By looking at these display pictures, the operator can recognize a correlation between the regenerative chatter, the total cutting amount, and the tool life; therefore, for example, the operator can quickly recognize a spindle rotation speed and a cutting speed which provide an appropriate tool life and a preferable total cutting amount within the range where no regenerative chatter occurs.

Figure 13:
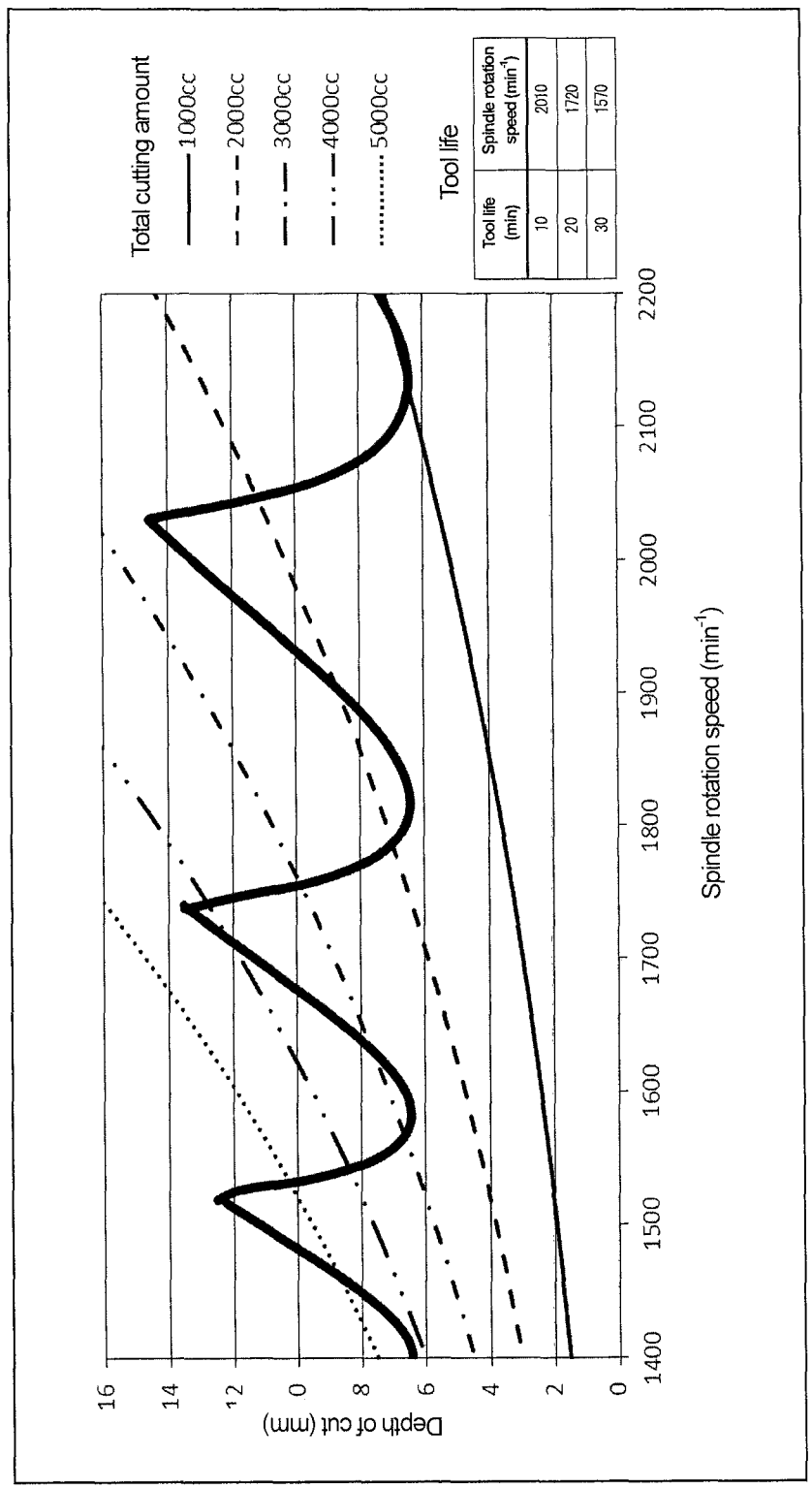
FIG. 13 is an illustration showing an example of the display pictures displayed on the display device in the embodiment.

Similarly to FIG. 12, FIG. 13 shows a table showing a relationship between the tool life and the spindle rotation speed in addition to the stability lobe (the waveform diagram depicted with a bold solid line) and diagram for the total cutting amount shown in FIG. 11, which are displayed in a mutually superimposed manner. These display pictures also allow the operator to recognize the correlation between the regenerative chatter, the total cutting amount, and the tool life; therefore, for example, the operator can recognize a spindle rotation speed and a depth of cut which provide an appropriate tool life and a preferable total cutting amount within the range where no regenerative chatter occurs.

Figure 14:
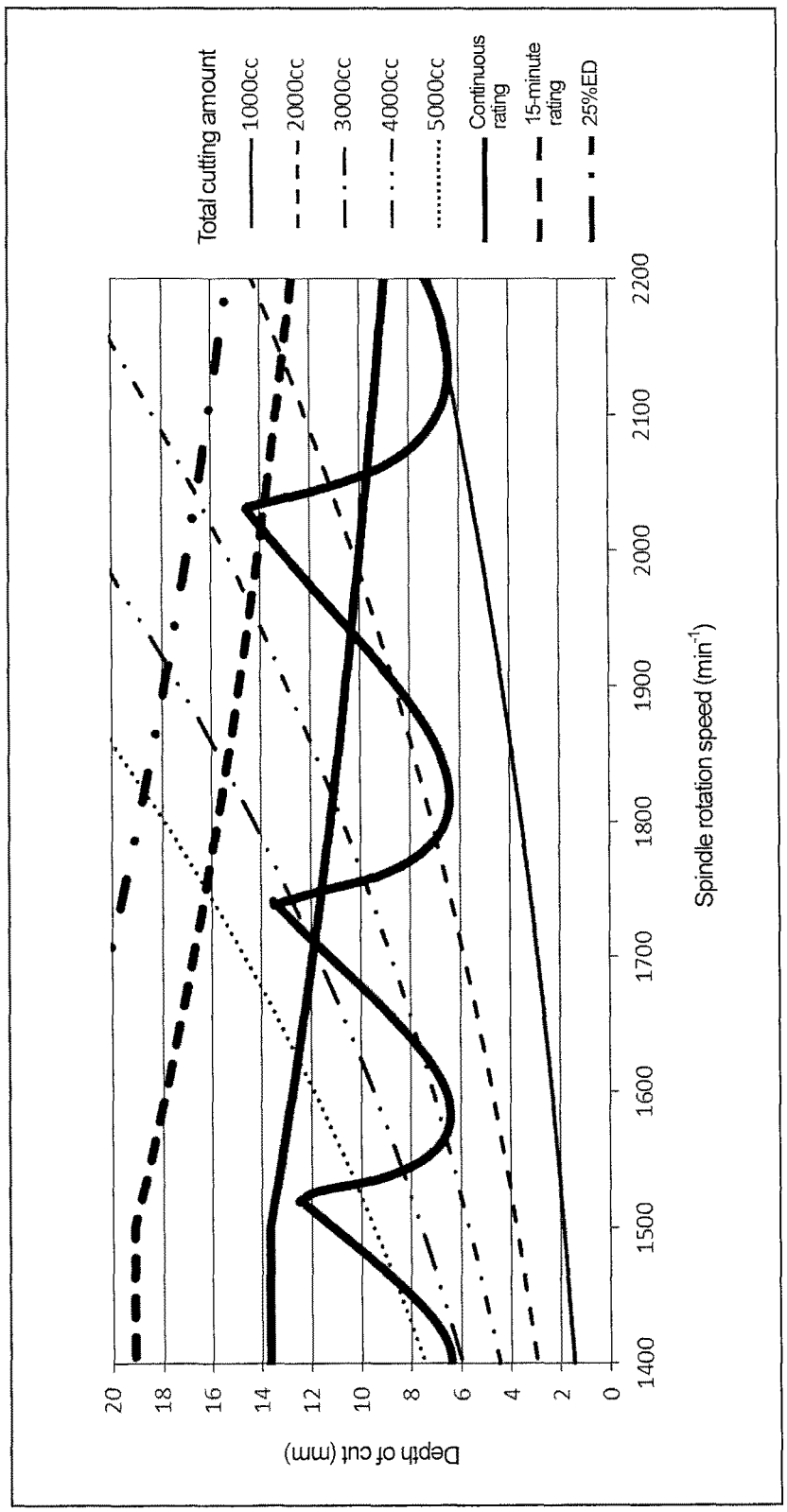
FIG. 14 is an illustration showing an example of the display pictures displayed on the display device in the embodiment.

FIG. 14 shows a diagram showing a correlation between the limit of the load acting on the spindle motor and the spindle rotation speed and depth of cut in addition to the stability lobe (the waveform diagram depicted with a bold solid line) and diagram for the total cutting amount shown in FIG. 11, which are displayed in a superimposed manner. Note that a relationship between the spindle rotation speed and the depth of cut for the case where the load acting on the spindle motor is set to the continuous rating is depicted with a bold solid line, a relationship for the case of the 15-minute rating is depicted with a bold broken line, and a relationship for the case of the 25% ED is depicted with a bold one-dot chain line. By looking at these display pictures, the operator can recognize a correlation between the regenerative chatter, the total cutting amount, and the spindle motor load; therefore, for example, the operator can quickly recognize a spindle rotation speed and a depth of cut which provide a preferable total cutting amount within the range where no regenerative chatter occurs and the spindle motor load is in a predetermined state (for example, a state of being on or below the continuous rating).

Figure 15:
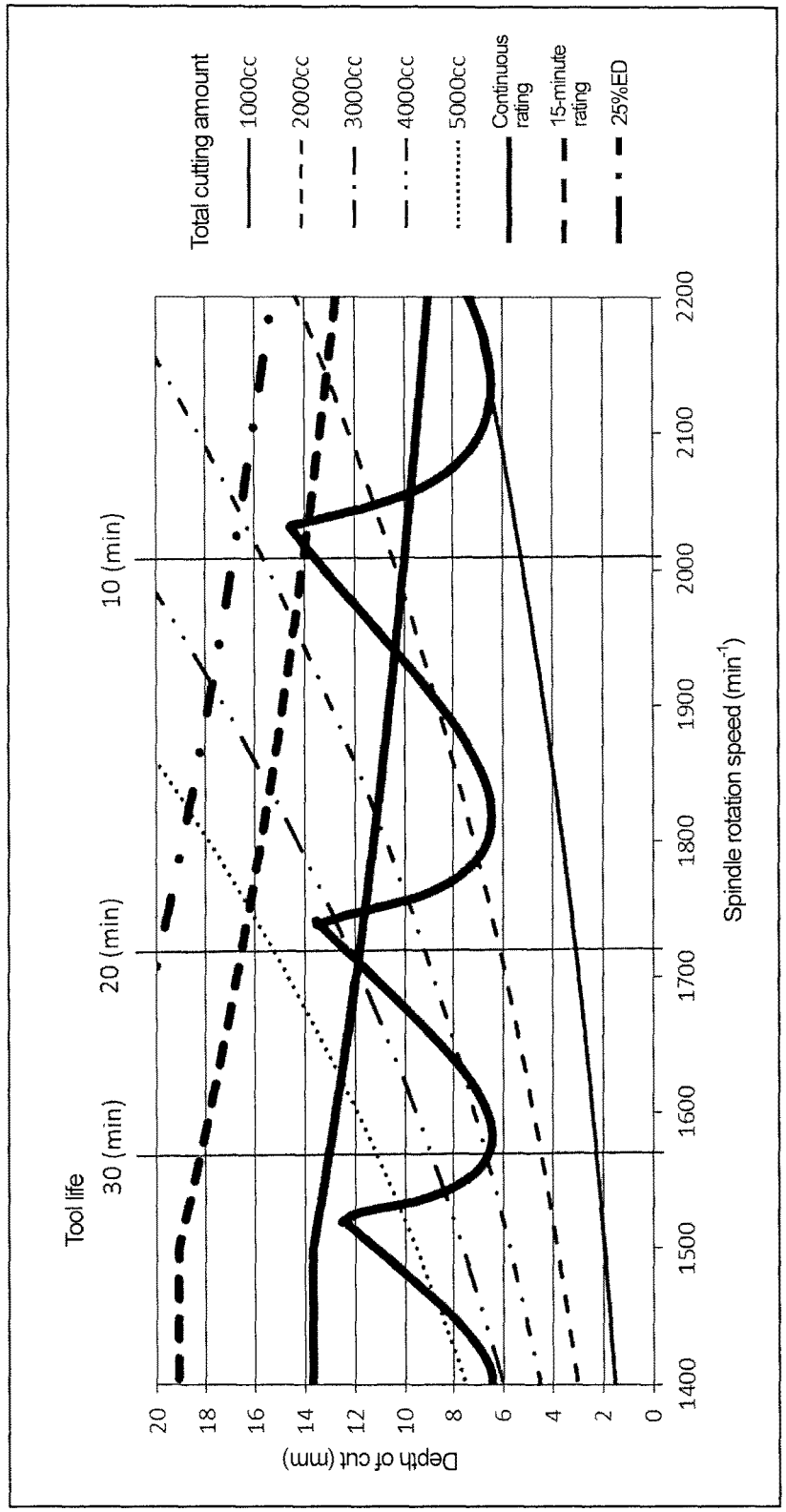
FIG. 15 is an illustration showing an example of the display pictures displayed on the display device in the embodiment.

FIG. 15 shows a diagram showing a correlation between the limit of the load acting on the spindle motor and the spindle rotation speed and depth of cut in addition to the stability lobe (the waveform diagram depicted with a bold solid line), diagram for the total cutting amount, and diagram for the tool life shown in FIG. 11, which are displayed in a mutually superimposed manner. By looking at these display pictures, the operator can recognize a correlation between the regenerative chatter, the total cutting amount, the tool life, and the spindle motor load; therefore, the operator can quickly recognize a spindle rotation speed and a depth of cut which provide an appropriate tool life and a more preferable total cutting amount within the range where no regenerative chatter occurs and the spindle motor load is in a predetermined state (for example, a state of being below the continuous rating).

As described above, in the machining status display apparatus 1 according to this embodiment, a stability lobe and other machining related information relating to the cutting efficiency, the total cutting amount, the tool life, and the spindle motor load are displayed in a mutually superimposed manner. Accordingly, by visually recognizing the displayed information, the operator can quickly recognize preferable machining conditions which are based on comprehensive consideration of the stability lobe and the displayed machining related information. Further, by adding his own knowledge to the machining status recognized from the display pictures for more comprehensive consideration, the operator can set more preferable machining conditions which are based on more comprehensive consideration of machining efficiency, machining costs, and machining accuracy.

Further, based on the first correlation data obtained by the stability lobe picture creator 3 and the machining related information obtained by the first machining information picture creator 4, the second machining information picture creator 9 calculates the second correlation data relating to the correlation between the spindle rotation speed and the machining related information in machining with the limit depth of cut. Based on the calculated second correlation data, the second machining information picture creator 9 creates display picture data for displaying a diagram relating to the correlation between the spindle rotation speed and the machining related information. When the second machining information picture creator 9 has created the display picture data, the created display picture data is transmitted to the display controller 10, and the diagram relating to the correlation between the spindle rotation speed and the machining related information is displayed on the display screen of the display device 12 under control by the display controller 10.

Figure 18:
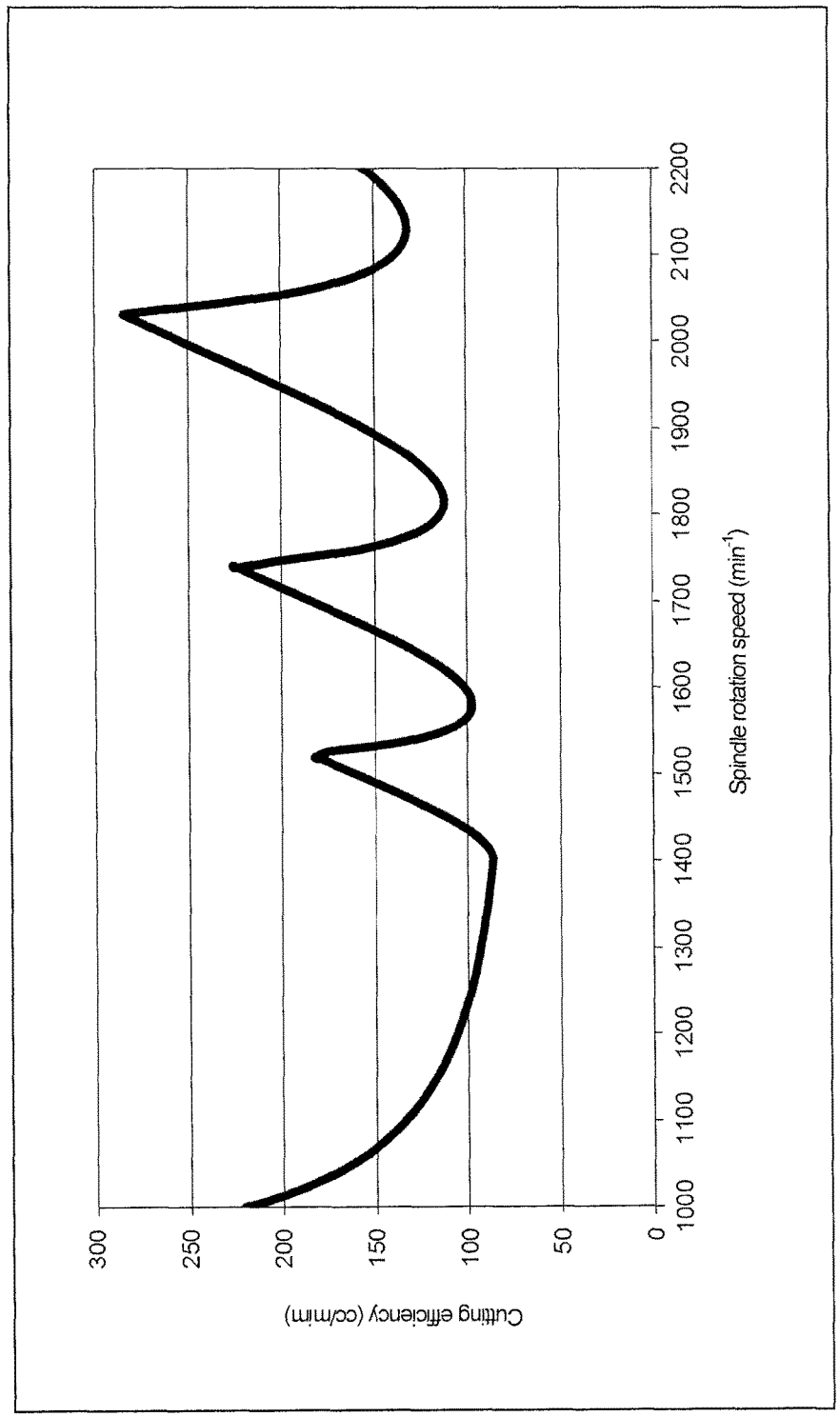
FIG. 18 is an illustration showing an example of the display pictures displayed on the display device in the embodiment.
Figure 19:
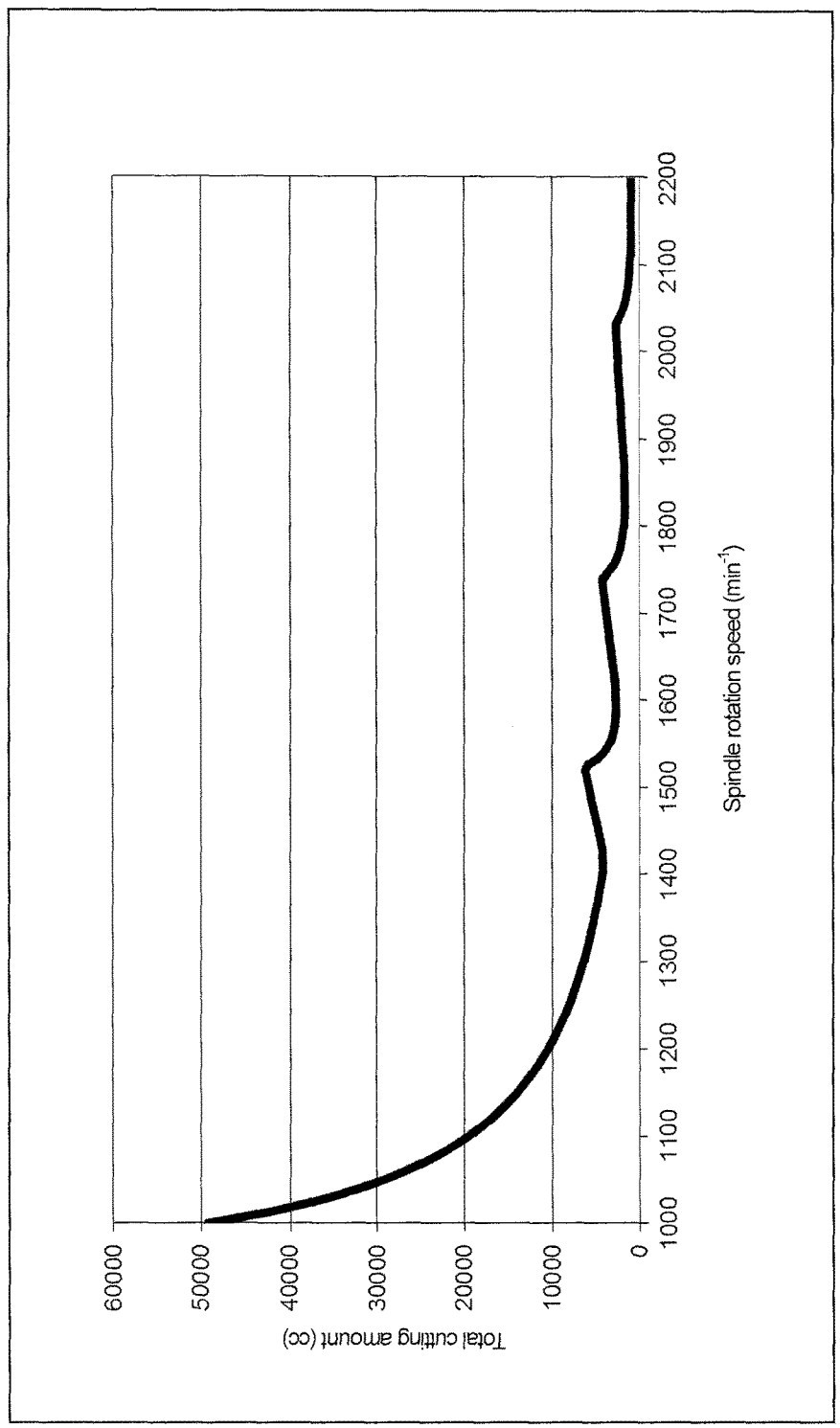
FIG. 19 is an illustration showing an example of the display pictures displayed on the display device in the embodiment.

Examples of the correlation diagram between the spindle rotation speed and the machining related information displayed on the display device 12 in the above-described manner are shown in FIGS. 18 and 19. Note that the display pictures shown in FIGS. 18 and 19 are also each displayed on the display device 12 by being selected as appropriate by the operator.

FIG. 18 shows a diagram showing a correlation between the spindle rotation speed [min$^{-1}$] and the cutting efficiency [cc/min] in machining with the limit depth of cut; the second correlation data relating to this correlation can be calculated by, in the above-described FIG. 6, calculating the cutting efficiency corresponding to the limit depth of cut at each spindle rotation speed. For example, in FIG. 6, the cutting efficiency corresponding to the limit depth of cut at a spindle rotation speed of 1500 [min$^{-1}$] is 150 [cc], and the cutting efficiency corresponding to the limit depth of cut at a spindle rotation speed of 1600 [min$^{-1}$] is 100 [cc]. The second machining information picture creator 9 calculates the second correlation data relating to the correlation between the spindle rotation speed and the cutting efficiency in machining with the limit depth of cut in this manner, and creates display picture data for the correlation diagram as shown in FIG. 18 based on the calculated second correlation data.

Further, FIG. 19 shows a diagram showing a correlation between the spindle rotation speed [min$^{-1}$] and the total cutting amount [cc] in machining with the limit depth of cut; the second correlation data relating to this correlation can be calculated by, in the above-described FIG. 11, calculating the total cutting amount corresponding to the limit depth of cut at each spindle rotation speed. For example, in FIG. 11, the total cutting amount corresponding to the limit depth of cut at a spindle rotation speed of 1600 [min$^{-1}$] is 2800 [cc], and the total cutting amount corresponding to the limit depth of cut at a spindle rotation speed of 1700 [min$^{-1}$] is 3800 [cc]. The second machining information picture creator 9 calculates the second correlation data for the correlation between the spindle rotation speed and the total cutting amount in machining with the limit depth of cut in this manner, and creates display picture data for the correlation diagram as shown in FIG. 19 based on the calculated second correlation data.

Accordingly, by looking at the correlation diagram between the spindle rotation speed and the machining related information in machining with the limit depth of cut displayed on the display screen of the display device 12, the operator can intuitively recognize which spindle rotation speed provides the most preferable machining status within the range where no regenerative chatter occurs.

For example, looking at the correlation diagram between the spindle rotation speed and the cutting efficiency as shown in FIG. 18 allows the operator to intuitively recognize which spindle rotation speed achieves machining with the highest cutting efficiency within the range where no regenerative chatter occurs. Further, looking at the correlation diagram between the spindle rotation speed and the total cutting amount as shown in FIG. 19 allows the operator to intuitively recognize which spindle rotation speed achieves machining with machining efficiency and tool costs well balanced with each other within the range where no regenerative chatter occurs.

Hereinbefore, a specific embodiment of the present disclosure has been described. However, the present disclosure is not limited thereto and can be implemented in other modes.

For example, although examples of the display pictures in the above embodiment are shown in FIGS. 6 to 15, the modes of the display pictures are not limited to the examples and the display pictures may be displayed in other modes. Further, another piece of information may be additionally displayed; in FIGS. 6 to 10, information relating to the total cutting amount may be additionally displayed, or, in FIGS. 11 to 15, information relating to the cutting efficiency may be additionally displayed.

Figure 20:
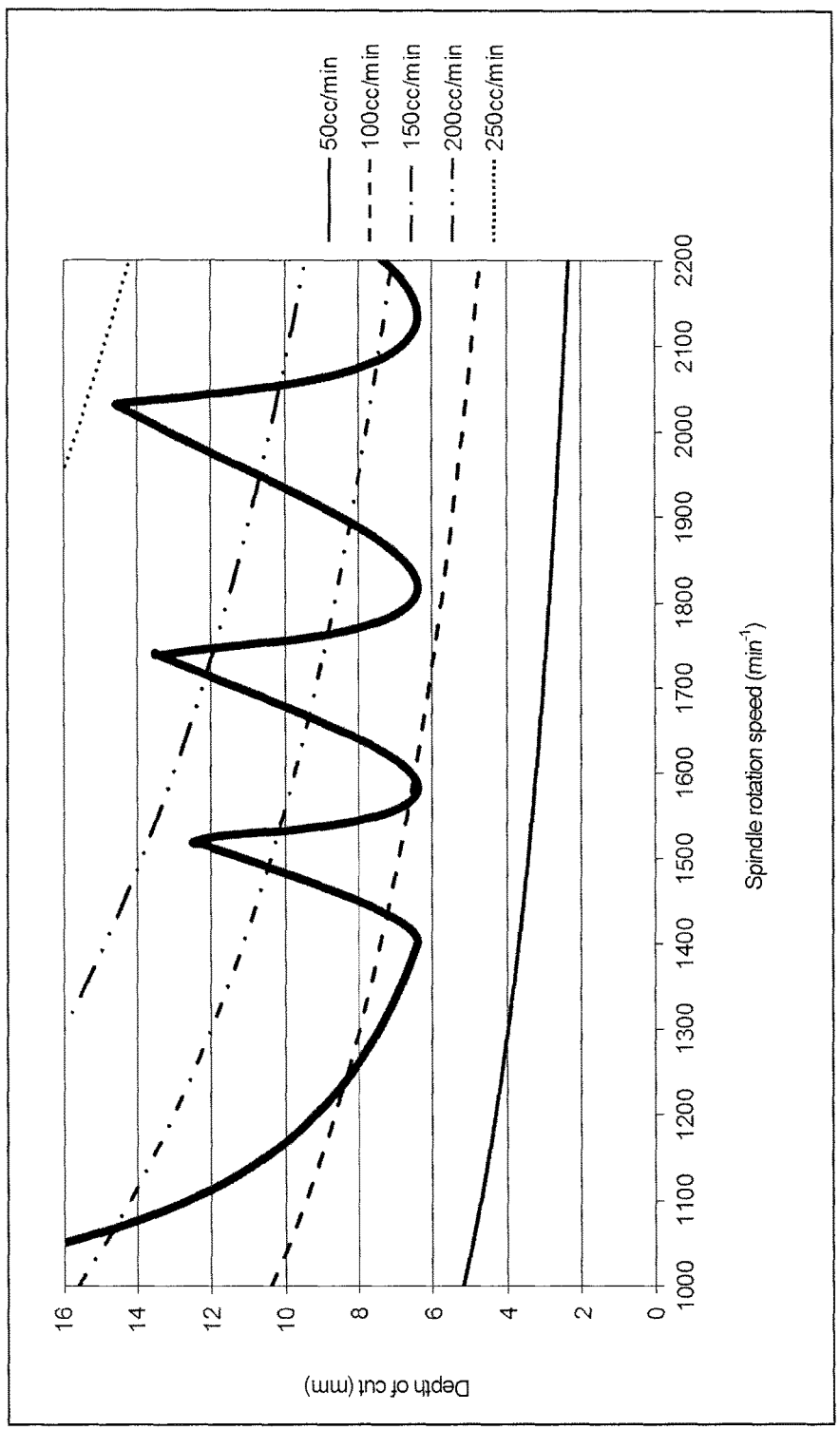
FIG. 20 is an illustration showing an example of display pictures displayed on a display device in another embodiment of the present disclosure.

Further, although the stability lobe created by the stability lobe picture creator 3 in the above embodiment is a diagram created in accordance with the so-called theory of stable pocket, the present disclosure is not limited thereto and, as shown in FIG. 20, a stability lobe created by adding a diagram taking into account process damping to a stability lobe created in accordance with the theory of stable pocket may be used. A stability lobe created in accordance with the theory of stable pocket is suitable for a region where the spindle rotation speed is relatively high. On the other hand, in a region where the spindle rotation speed is relatively low, a vibration suppression action which is called "process damping" appears; therefore, a stability lobe taking into account process damping is suitable for such a low speed region. With such a stability lobe taking into account process damping, it is possible to show a suitable stability limit in the entire region from the region of low spindle rotation speed to the region of high spindle rotation speed.

The diagram portion taking into account process damping can be calculated by, for example, the following calculation equation:

$$a_{plim}'=a_{plim}/(1-(n_{as}/n_{lim})),$$ (Equation 16)

where $a_{plim}'$ is a limit depth of cut [mm] taking into account process damping, $a_{plim}$ is a limit depth of cut [mm] being in accordance with the theory of stable pocket, $n_{lim}$ is a spindle rotation speed [min$^{-1}$], and $n_{as}$ is a critical spindle rotation speed [min$^{-1}$]. The critical spindle rotation speed means a spindle rotation speed at or below which no chatter occurs at any depth of cut.

Note that FIG. 20 corresponds to FIG. 6, wherein a stability lobe taking into account process damping is applied instead of the stability lobe shown in FIG. 6. Similarly, also in FIGS. 7 to 15, a stability lobe taking into account process damping can be applied instead of the stability lobe created in accordance with the theory of stable pocket.

Further, the second machining information picture creator 9 may be configured to calculate the second correlation data based on the display picture data for the stability lobe created by the stability lobe picture creator 3 and the display picture data for the machining related information created by the first machining information picture creator 4. The second correlation data can be calculated also based on these display picture data.

What is claimed is:

1. A machining status display apparatus, comprising:
a display device having a display screen;
a stability lobe picture creator obtaining, based on specifications of a tool to be used, first correlation data relating to a correlation between a spindle rotation speed and a limit depth of cut of the tool above which regenerative chatter occurs, and creating display picture data for displaying a stability lobe as a correlation diagram between the spindle rotation speed and the limit depth of cut based on the obtained first correction data;
a first machining information picture creator obtaining machining related information which is other than the regenerative chatter and corresponds to the spindle rotation speed and limit depth of cut and which corresponds to set machining conditions, and creating display picture data for displaying the obtained machining related information as a diagram corresponding to a relation between the machining related information and the spindle rotation speed and limit depth of cut; and
a display controller displaying the stability lobe and the diagram relating to the machining related information with the stability lobe and the diagram relating to the machining related information overlapped each other on the display screen of the display device based on the display picture data for the stability lobe created by the stability lobe picture creator and the display picture data for the diagram created by the first machining information picture creator.

2. The machining status display apparatus of claim 1, wherein:
the first machining information picture creator is configured to obtain, as the machining related information, one or more pieces of information selected from among information relating to a cutting efficiency, information relating to a total cutting amount the tool to be used is able to cut before reaching an end of its tool life, and information relating to a load acting on a spindle motor, and create one or more pieces of display picture data corresponding to the selected one or more pieces of information for displaying a diagram for each of the obtained selected one or more pieces of information; and the display controller is configured to display the stability lobe and the diagram for each of the selected one or more pieces of information with the stability lobe and the diagram for each of the selected one or more pieces of information overlapped each other on the display screen of the display device.

3. The machining status display apparatus of claim 1, further comprising a second machining information picture creator obtaining, based on the first correlation data obtained by the stability lobe picture creator and the machining related information obtained by the first machining information picture creator or based on the display picture data for the stability lobe created by the stability lobe picture creator and the display picture data for the machining related information created by the first machining information picture creator, second correlation data relating to a correlation between the spindle rotation speed and the machining related information in machining with the limit depth of cut, and creating display picture data for displaying a diagram relating to the correlation between the spindle rotation speed and the machining related information based on the obtained second correlation data, wherein:

the display controller is further configured to display a correlation diagram between the spindle rotation speed and the machining related information on the display screen of the display device based on the display picture data created by the second machining information picture creator.

4. The machining status display apparatus of claim 2, further comprising a second machining information picture creator obtaining, based on the first correlation data obtained by the stability lobe picture creator and the machining related information obtained by the first machining information picture creator or based on the display picture data for the stability lobe created by the stability lobe picture creator and the display picture data for the machining related information created by the first machining information picture creator, second correlation data relating to a correlation between the spindle rotation speed and the machining related information in machining with the limit depth of cut, and creating display picture data for displaying a diagram relating to the correlation between the spindle rotation speed and the machining related information based on the obtained second correlation data, wherein:

the display controller is further configured to display a correlation diagram between the spindle rotation speed and the machining related information on the display screen of the display device based on the display picture data created by the second machining information picture creator.

5. A computer program product, comprising:
a computer program for causing a computer to function as:
a stability lobe picture creator obtaining, based on specifications of a tool to be used, first correlation data relating to a correlation between a spindle rotation speed and a limit depth of cut of the tool above which regenerative chatter occurs, and creating display picture data for displaying a stability lobe as a correlation diagram between the spindle rotation speed and the limit depth of cut based on the obtained first correction data;

a first machining information picture creator obtaining machining related information which is other than the regenerative chatter and corresponds to the spindle rotation speed and limit depth of cut and which corresponds to set machining conditions, and creating display picture data for displaying the obtained machining related information as a diagram corresponding to a relation between the machining related information and the spindle rotation speed and limit depth of cut; and a display controller displaying the stability lobe and the diagram relating to the machining related information with the stability lobe and the diagram relating to the machining related information overlapped each other on the display screen of the display device based on the display picture data for the stability lobe created by the stability lobe picture creator and the display picture data for the diagram created by the first machining information picture creator.

6. The computer program product of claim 5, wherein:
the first machining information picture creator operates to obtain, as the machining related information, one or more pieces of information selected from among information relating to a cutting efficiency, information relating to a total cutting amount the tool to be used is able to cut before reaching an end of its tool life, and information relating to a load acting on a spindle motor, and create one or more pieces of display picture data corresponding to the selected one or more pieces of information for displaying a diagram for each of the obtained selected one or more pieces of information; and the display controller operates to display the stability lobe and the diagram for each of the selected one or more pieces of information with the stability lobe and the diagram for each of the selected one or more pieces of information overlapped each other on the display screen of the display device.

7. The computer program product of claim 5, wherein:
the computer program further causes the computer to function as a second machining information picture creator obtaining, based on the first correlation data obtained by the stability lobe picture creator and the machining related information obtained by the first machining information picture creator or based on the display picture data for the stability lobe created by the stability lobe picture creator and the display picture data for the machining related information created by the first machining information picture creator, second correlation data relating to a correlation between the spindle rotation speed and the machining related information in machining with the limit depth of cut, and creating display picture data for displaying a diagram relating to the correlation between the spindle rotation speed and the machining related information based on the obtained second correlation data; and the display controller further operates to display a correlation diagram between the spindle rotation speed and the machining related information on the display screen of the display device based on the display picture data created by the second machining information picture creator.

8. The computer program product of claim 6, wherein:
the computer program further causes the computer to function as a second machining information picture creator obtaining, based on the first correlation data obtained by the stability lobe picture creator and the machining related information obtained by the first machining information picture creator or based on the display picture data for the stability lobe created by the stability lobe picture creator and the display picture data for the machining related information created by the first machining information picture creator, second correlation data relating to a correlation between the spindle rotation speed and the machining related information in machining with the limit depth of cut, and creating display picture data for displaying a diagram relating to the correlation between the spindle rotation speed and the machining related information based on the obtained second correlation data; and the display controller further operates to display a correlation diagram between the spindle rotation speed and the machining related information on the display screen of the display device based on the display picture data created by the second machining information picture creator.

9. The computer program product of claim 5, wherein the computer program product is stored on a computer-readable storage medium.

10. The computer program product of claim 6, wherein the computer program product is stored on a computer-readable storage medium.

11. The computer program product of claim 7, wherein the computer program product is stored on a computer-readable storage medium.

12. The computer program product of claim 8, wherein the computer program product is stored on a computer-readable storage medium.

* * * * *